United States Patent [19]

Tezuka

[11] Patent Number: 5,381,286
[45] Date of Patent: Jan. 10, 1995

[54] RECORDING OR REPRODUCING APPARATUS INCLUDING A DISC CARTRIDGE LOADING MECHANISM

[75] Inventor: Nobuo Tezuka, Kanagawa, Japan

[73] Assignee: Canon Kabushiki Kaisha, Tokyo, Japan

[21] Appl. No.: 859,345

[22] Filed: Mar. 27, 1992

Related U.S. Application Data

[62] Division of Ser. No. 526,190, May 18, 1990, Pat. No. 5,119,247.

[30] Foreign Application Priority Data

| Apr. 25, 1983 | [JP] | Japan | 58-72429 |
| Oct. 27, 1983 | [JP] | Japan | 58-201517 |
| Mar. 9, 1984 | [JP] | Japan | 59-45196 |

[51] Int. Cl.⁶ .................. G11B 5/016; G11B 5/012
[52] U.S. Cl. .................. 360/99.05; 360/96.5; 360/97.01
[58] Field of Search ............ 360/99.05, 99.06, 97.01, 360/96.5, 75

[56] References Cited

U.S. PATENT DOCUMENTS

| 4,139,876 | 2/1979 | Owens | 360/99.06 |
| 4,376,293 | 3/1983 | Teramura et al. | 360/71 |
| 4,380,781 | 4/1983 | Hirata | 360/99.06 |
| 4,412,260 | 10/1983 | Stricklin | 360/99.06 |
| 4,466,032 | 8/1984 | Saito | 360/99.05 |
| 4,466,037 | 8/1984 | Yoshida et al. | 360/133 |
| 4,498,161 | 2/1985 | Eisemann | 360/75.2 |
| 4,498,165 | 2/1985 | Wilkinson, Jr. | 369/270 |
| 4,502,136 | 2/1985 | Rickert et al. | 369/271 |
| 4,949,205 | 8/1990 | Tezuka | 360/99.05 |
| 5,119,247 | 6/1992 | Tezuka | 360/99.05 X |

FOREIGN PATENT DOCUMENTS

| 57-105861 | 7/1982 | Japan | 360/135 |
| 57-167171 | 10/1982 | Japan | 360/97.05 |
| 58-70457 | 4/1983 | Japan | 360/135 |
| 58-143463 | 8/1983 | Japan | 360/135 |
| 2101391 | 1/1983 | United Kingdom | 360/133 |

*Primary Examiner*—John H. Wolff
*Attorney, Agent, or Firm*—Robin, Blecker, Daley & Driscoll

[57] ABSTRACT

An apparatus for recording and/or reproducing information using a flexible magnetic disc housed in a cassette having a recording or reproducing mechanism for recording and/or reproducing the information on and-/or from the disc, a rotary driving device for engaging an engaging part formed on the disc and for rotating the disc, a cover movable from a first position where the cover can receive the cassette to a second position where the cassette can engage with the rotary driving device, a pressing device having a pressing part for pressing the engaging part of the disc, wherein as the disc is moved by the cover from the first position to the second position, the pressing part is caused to come into contact with the engaging part and the pressing part is pressed against the engaging part under the action of a pressing force of the pressing device to press the engaging part onto the rotary driving device to mount it thereon, and the pressing of the pressing device is released to separate the pressing part from the engaging part and a control part for enabling operation of the recording or reproducing mechanism after the pressing of the pressing device against the engaging part of the disc has been released.

12 Claims, 15 Drawing Sheets

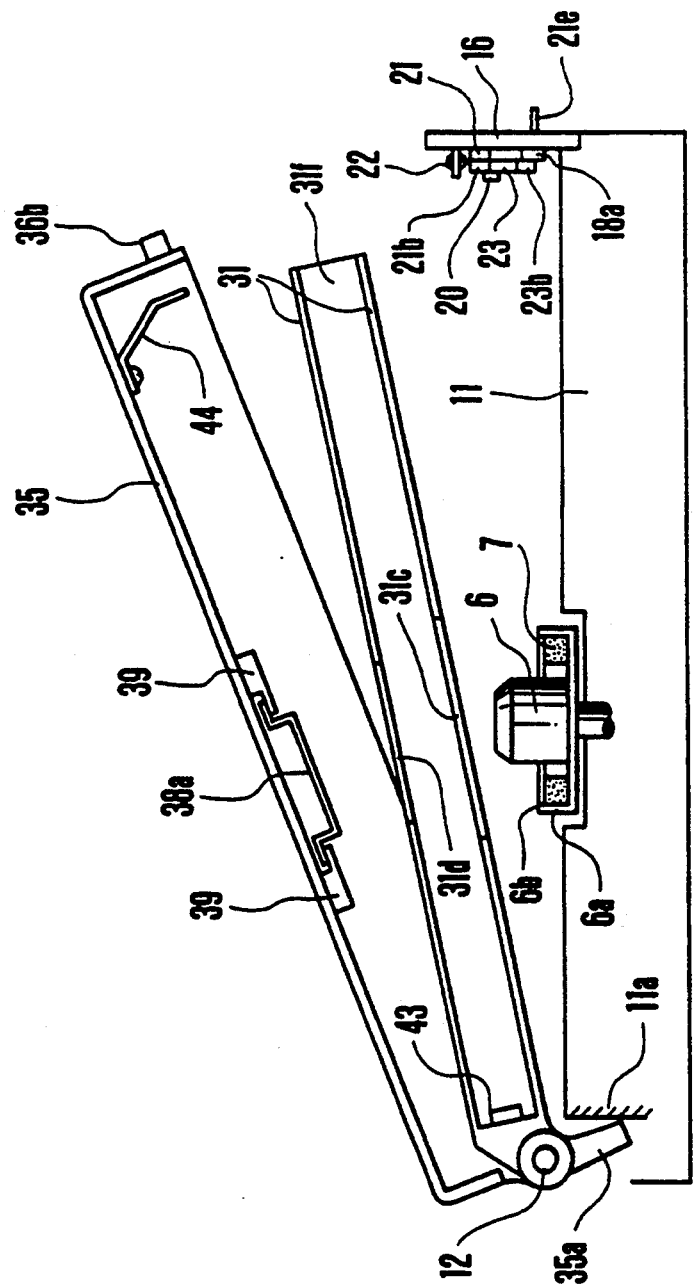

F I G.12
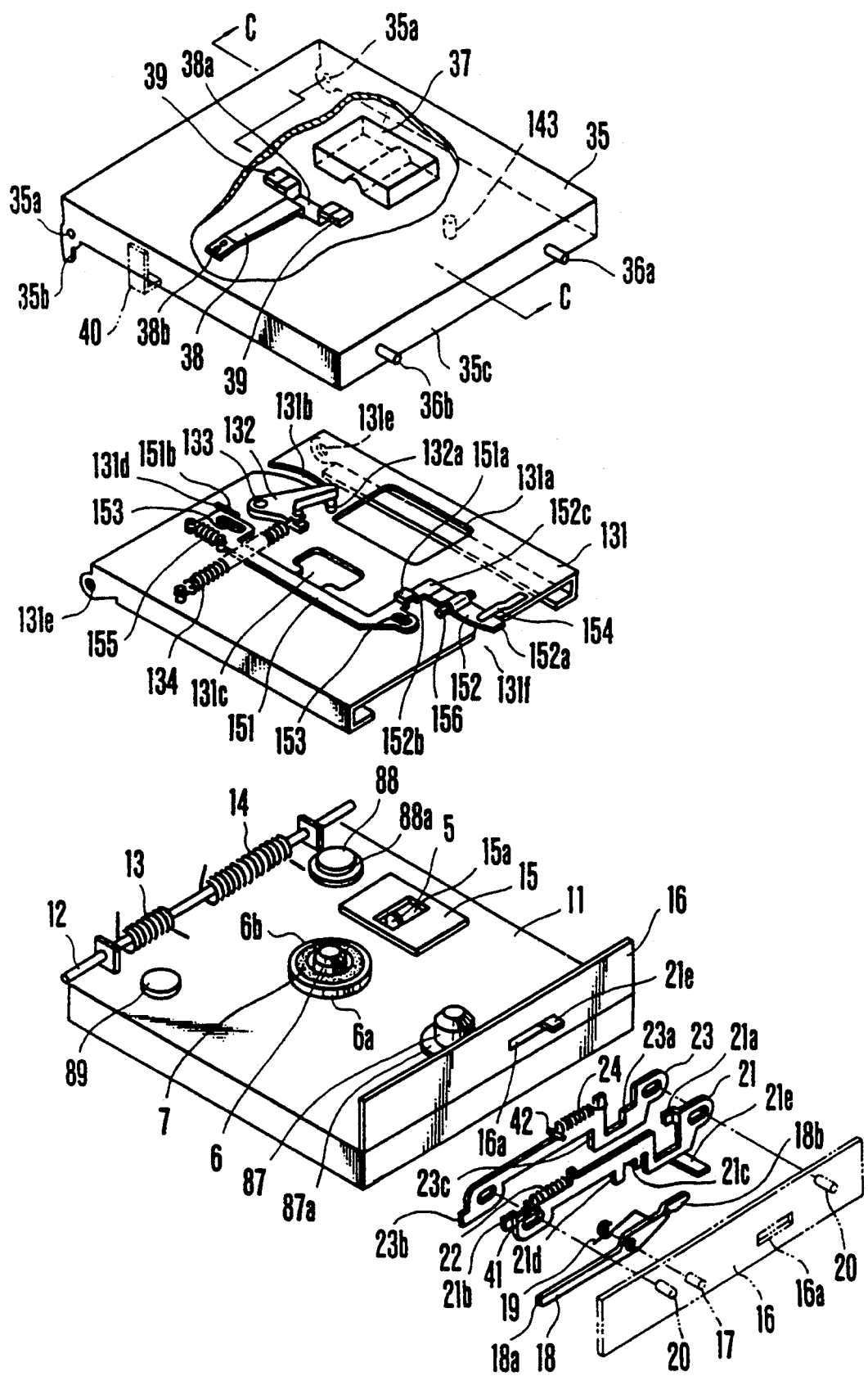

RECORDING OR REPRODUCING APPARATUS INCLUDING A DISC CARTRIDGE LOADING MECHANISM

This application is a division, of application Ser. No. 526,190, filed May 18, 1990, now U.S. Pat. No. 5,119,247.

BACKGROUND OF THE INVENTION

1. Field of the Invention

This invention relates to recording or reproducing apparatus, and more particularly to a mechanism for bringing a record bearing medium into resting engagement on the coupling portion of the apparatus.

2. Description of the Prior Art

There have been known a wide variety or apparatus for recording or reproducing informations by using, for example, rotating magnetic discs as the record bearing medium. In such apparatus it is required to set the record bearing medium on the coupling portion or spindle of the apparatus accurately and reliably. That is, if setting of the record bearing medium is imperfect, as information is then recorded on eccentric tracks to the axis of rotation of the spindle, it will result that when the record bearing medium is transferred to, and reproduced by another apparatus, the track cannot be well traced. Also an accidental inclination of the record bearing medium to the spindle fails to assure good contact of the head with the medium, thus leading to some possibility of occurrence of errors in signal transformation between the head and the medium, and damages of the head and medium.

Attempts have been made to eliminate the above-described drawbacks by applying pressure to the record bearing medium as it is loaded on the rotating spindle of the apparatus, or by using a tapered form of the spindle, so as to reduce the possibility of occurrence of the above-described eccentric settings. For this purpose, means is provided for locating the record bearing medium in a prescribed position, taking, for one example, the form of a permanent magnet piece and a magnetizable member, one of which is put on the rotating spindle and the other of which is mounted on the core of the medium so that an attractive force exerted therebetween can bring the medium into resting engagement on the spindle. Another example is to use a mechanism having pressing means arranged upon preliminary loading of the record bearing medium to proceed the loading by forcibly pushing said medium against the spindle and then upon recording/reproducing to rotate as a unit with said medium, or to maintain the contacting state.

In the former case or the method using a permanent magnet, however, there is need to increase the attractive force of the permanent magnet sufficiently. This calls for an increase in the volume of the permanent magnet, or an expensive magnetic material selected from the rare earth group has to be employed. Further, increasing of the attractive force of the permanent magnet has a limitation for the record bearing medium in the form of the magnetic disc, because the much-desired increase in the magnetic force gives appreciable influence to the recording/reproducing of the information. Also in the latter case, since the pressing means, even after having set the record bearing medium on the spindle, is left in engagement with the medium during the recording or reproducing operation, and this places a load on the spindle, accurate control of the rotation of the record bearing medium becomes difficult to achieve. Particularly in application to the type of recording or reproducing apparatus which uses small-sized rotating magnetic discs, this problem becomes serious.

Apart from this, in the apparatus of the type described above, from consideration of speeding up the recording or reproducing, it would be very advantageous that the sure resting of the record bearing medium on the spindle is immediately followed by automatic setting of the recording or reproducing head in a predetermined start position, or initiation of a recording or reproducing operation. This aspect is very important particularly for the still picture recording apparatus such as the still video camera in view of reducing the possibility of missing the recording chance (corresponding to the so-called "shutter chance" for the known film camera).

Further apart from the above, where the record bearing medium is housed in a container called cassette, jacket, or pack (hereinafter abbreviated as cassette), there has been made a proposal for allowing the cassette to partly project itself outwardly of a chamber therefor within the casing of the recording or reproducing apparatus in automatic response to actuation of a removal control member so as to facilitate the removing operation of the cassette from the recording or reproducing apparatus. To achieve this, for example, ejecting means is used which comprises a spring or other suitable resilient member on which power is stored when the cassette is inserted into the chamber. When the cassette is to be removed, the bias force of the spring expels a portion of the cassette out of the apparatus.

By the way, the use of such means often leads to such an accident that when the operator removes his hand from the cassette in the fully inserted position, the cassette jumps out of the apparatus due to the action of the bias force of the resilient member. It is, therefore, desirable to employ means for holding the cassette in a prescribed position when the cassette is fully inserted. To this end, it has been proposed to construct the holding means in the form of a latch arranged to act on the cassette when it is fully inserted into the chamber, so that the cassette is prevented from ejection. With the use of this latch member, however, it becomes necessary to additionally use some means for releasing the cassette from the latching connection when the cassette is to be ejected. Then, it has been proposed that an actuator for this latch release means is arranged to operate either when a cassette removal control member is operated, or when the cassette chamber moves to the recording or reproducing stage.

However, the former arrangement tends not only to increase the complexity of structure of the necessary linking mechanism, but also to produce a difficult problem that the timing of displacement of the cassette chamber or the outer cover to the cassette take-out position is properly related to the timing of the releasing of the cassette from the latching connection. If the timing relationship is incorrect, there will occur an accident that the cassette chamber reaches the take-out position before the cassette is released from the latching connection so that the cassette is no longer taken out. Also the latter arrangement has a difficult problem of the accuracy of the releasing position of the release member provided in the body of the recording or reproducing apparatus. If this is not accurate, the cassette will be released from the latching connection before the cassette chamber reaches the recording or reproducing stage so that the cassette is no longer set in the prescribed position.

SUMMARY OF THE INVENTION

The present invention has been made by bearing the foregoing situations in mind.

And under such circumstances, a first object of the present invention is to provide a recording or reproducing apparatus with automatic means making it possible to achieve an accurate and reliable engagement of a record bearing medium on a coupling portion of the apparatus in response to performance of an inevitable one of the steps of a loading operation of the medium onto the apparatus, thereby giving an advantage that the above-described permanent magnet becomes unnecessary to use at all, or the required value of attractive force is remarkably reduced, and further any increase in the load on the medium or a drive system therefor is not involved when recording or reproducing, and more particularly to provide a mechanism for loading the record bearing medium into such apparatus.

To accomplish the aforesaid first object, a preferred embodiment of the present invention that realizes one of the aspects of the invention comprises:

rotating means having a coupling portion for engagement with a record bearing medium; receiving means having an opening through which said record bearing medium is inserted thereto; cover means movable from a first position where the opening of said receiving means is cleared through a second position where it is closed to a third position; pressing means arranged upon movement of said cover means from its second to its third position to press said record bearing medium at a portion thereof so as to be set on the coupling portion of said rotating means; and arresting means for arresting said cover means in the second position as it returns from the third position.

A second object of the present invention is to provide a recording or reproducing apparatus using a rotating record bearing medium, particularly a recording or reproducing apparatus with said record bearing medium when in use having its coupling portion engaged on a rotatable drive portion of the rotating drive means, wherein soon after an accurate setting of the record bearing medium has been established, adjustment in position of a recording or reproducing head is automatically formed. This makes it possible to speed up the operation for recording or reproducing signals.

To accomplish the aforesaid second object, another preferred embodiment of the present invention which realizes one of the other aspects of the invention comprises:

rotating drive means provided with a coupling portion for engagement with a record bearing medium; a recording or reproducing head for said record bearing medium; head shift means for shifting said head relative to said record bearing medium; pressing means for temporarily applying pressure to a portion of said record bearing medium so that said record bearing medium rests on the coupling portion of said rotating drive means; detecting means for detecting when the record bearing medium is released from the pressing connection with said pressing means; and head shift control means responsive to the output of said detecting means for controlling said head shift means.

A third object of the present invention is to provide a recording or reproducing apparatus in which the record bearing medium can be released from the connection with eject preventing means without the necessity of using a complicated linking mechanism and of finely adjusting the timing relationship, and therefore ejecting of the record bearing medium can be accurately performed.

To accomplish the aforesaid third object, another preferred embodiment of the present invention that realizes a third aspect of the present invention comprises:

receiving means having an opening through which a record bearing medium enters; cover means movable from a first position where the opening of said receiving means is cleared to a third position beyond a second position where the opening is closed; preventing means for preventing the record bearing medium from being expelled while being left loaded in said receiving means; and releasing means for releasing the preventing means as said cover means moves to said third position.

Other objects and features of the present invention will become apparent from the following detailed description of the embodiments thereof taken in conjunction with the accompanying drawings.

BRIEF DESCRIPTION OF THE DRAWINGS

In the following the present invention is described in connection with embodiments thereof by reference to the drawings in which:

FIGS. 3A, 3B and 3C are cross-sectional views taken along a line A—A of FIG. 2 in different operative conditions.

FIG. 12 is an exploded perspective view of the third embodiment of the invention particularly with the parts essential to the invention.

DETAILED DESCRIPTION OF THE PREFERRED EMBODIMENTS

The present invention will next be described in connection with the embodiments as an example of application to a magnetic recording or reproducing apparatus using a rotary type flexible magnetic disc contained within a cassette. But the present invention is not confined thereto and is applicable to optical, photo-magnetic and electrostatic capacity types of recording or reproducing apparatus.

Any of the embodiments to be described below is suited to still video recording or reproducing apparatus, floppy disc apparatus and particularly apparatus which necessitate coupling of record bearing media with the drive portions.

Figure 1:
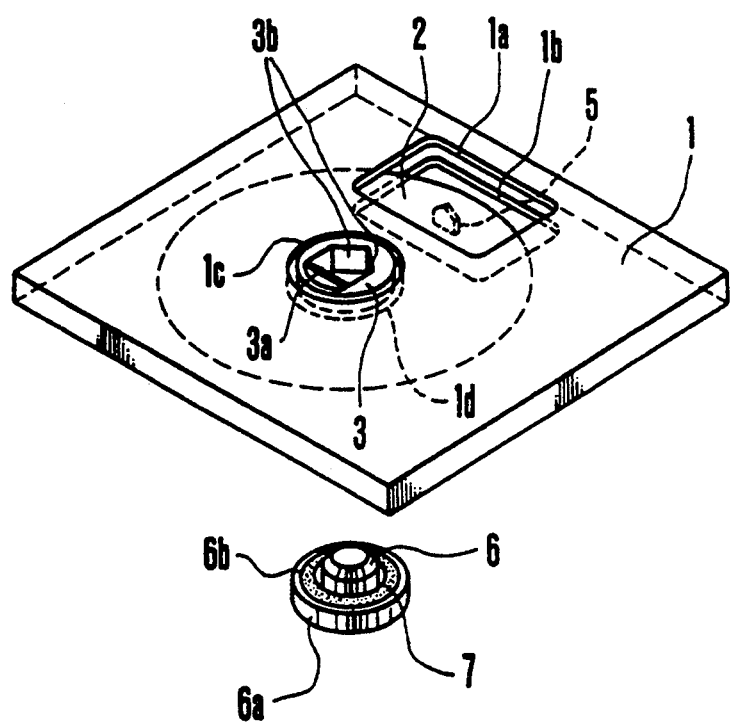
FIG. 1 is a perspective view of a record bearing medium container and a coupling portion of the apparatus usable in the first embodiment of the invention.

Referring first to FIG. 1, a record bearing medium container or cassette 1 has a flexible rotatable magnetic disc 2 as the record bearing medium housed in the interior thereof. Fixedly mounted on the central portion of the magnetic disc 2 is a center core 3 made of synthetic resin or the like, of which the lower surface fixedly carries a magnetic material (not shown). Upper and lower panels of the housing of the cassette 1 are provided with windows 1a and 1b respectively into which a stabilizer plate (to be described later) can insert for the purpose of stabilizing rotation of the disc 2. A magnetic head 5 projects inwardly of the lower window 1b to abut against the disc 2. A coupling portion 6 of rotating means for the center core 3 of the disc 2 to be driven to rotate by an electric motor (not shown) for rotation of the disc 2 is constructed in the form of a spindle having a flanged portion 6a with an annular upper fringe 6b on which the lower surface of the center core 3 rests so that the height of the disc 2 to the head 5 is defined. The flanged portion 6a of the spindle 6 is provided with a permanent magnet 7 to attract the magnetic material (not shown) on the center core 3. Hub holes 1c and 1d are formed in the upper and lower panels of the cassette 1 in alignment with the center core 3.

A fitting portion of the aforesaid center core 3 for the spindle 6 is formed with two inclined wall portions 3b and a resilient portion 3a by which the center core 3 is held in frictional engagement with the peripheral surface of the spindle 6. And by the frictional force and the attractive force of the magnet 7, the disc 2 is fixedly secured to the spindle 6. As these parts rotate as a unit, the aforesaid head 5 records or reproduces signals.

Now, the use of such coupling means provides some possibility of encountering a situation that as the force by which the inclined surfaces 3b of the center core 3 is pressed against the spindle 6 is large, the center core 3 cannot be rightly placed on the location surface (the upper surface of the fringe 6b of the flanged portion 6a) by the attractive force of the permanent magnet 7. This is due to the tolerances of dimensions of the spindle 6 and the engaging hole of the center core 3, the finishing conditions and ambient temperature. If the setting is imperfect as such, a good contact between the head 5 and the disc 2 is not constantly maintained. Therefore, the ability of recording or reproducing signals is often extremely deteriorated, and it often happens that the disc 2 is broken by the stabilizer (to be described later).

The first object of the invention is to eliminate such drawbacks. In the following, by reference to FIGS. 2 to 4C, how to accomplish the first object will be described in connection with the first embodiment of the invention.

Figure 2:
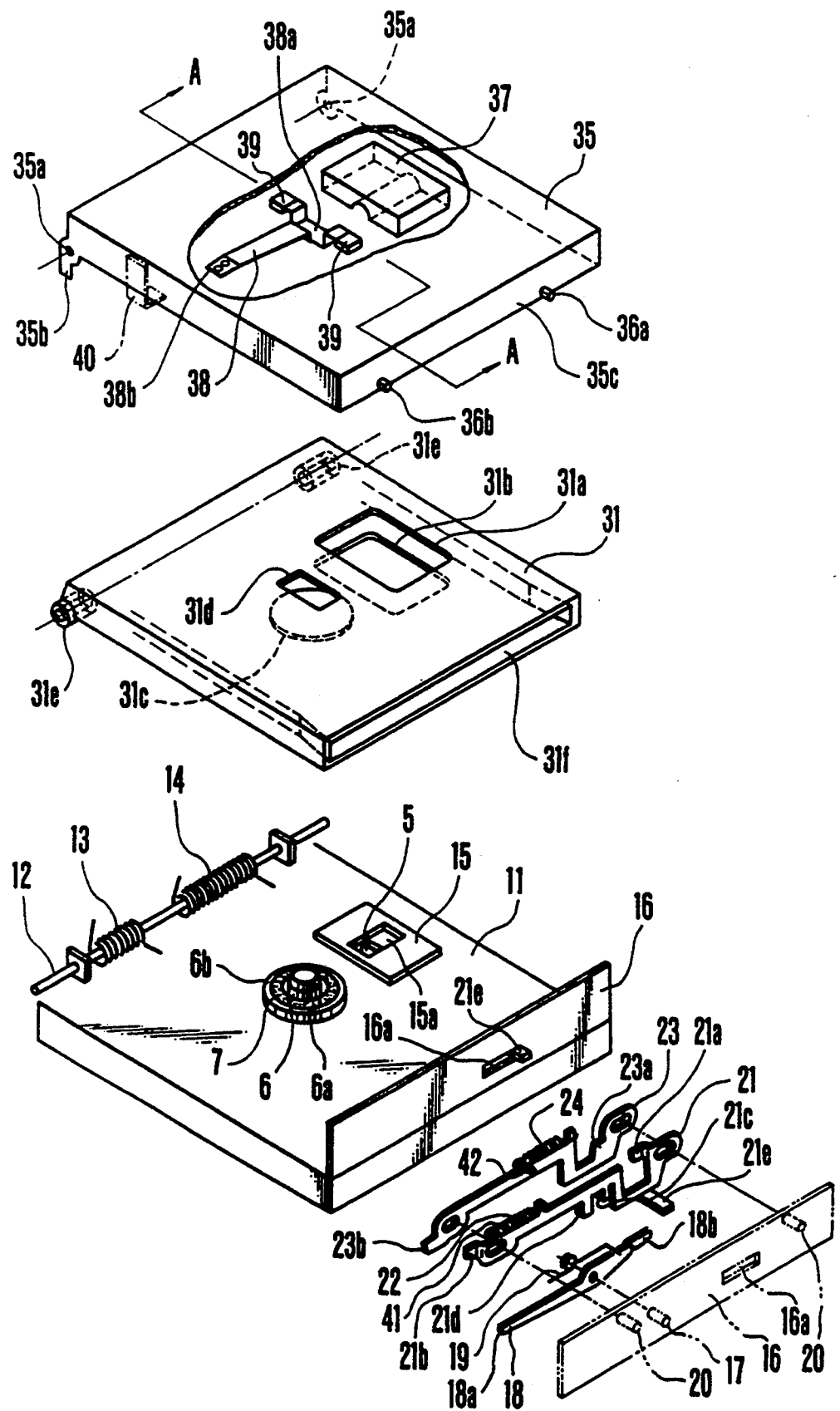
FIG. 2 is an exploded perspective view of the first embodiment of the present invention particularly with parts essential to the invention.

In FIG. 2, 11 denotes a portion of a body of the recording or reproducing apparatus including a recording or reproducing stage on which the aforesaid spindle 6 and the head 5 are positioned rotatably and shiftably respectively. Further provided on this portion 11 of the apparatus is a hinge shaft 12. A side plate 16 is mounted on the portion 11 and has a pivot pin 17 planted thereon, about which is turned a latch lever 18 as it is urged in a clockwise direction by a spring 19. Further planted on the side plate 16 are a pair of pins 20 engaging in respective slots of each of two lock sliders 21 and 23 which constitute arresting means for an outer cover 35 to be described later. Springs 22 and 24 urge the sliders 21 and 23 in a leftward direction as viewed in the drawings. Pins 41 and 42 for the springs 22 and 24 are fixedly mounted on the side plate 16.

A cassette holder 31 as the cassette receiving means is pivotally mounted with its hinge portions 31e on the aforesaid hinge shaft 12 to be movable relative to the portion 11 of the apparatus. The holder 31 has an opening 31f at one side thereof through which the aforesaid cassette 1 is inserted into the housing thereof. Windows 31a and 31b in the holder 31 are to allow entrance of respective stabilizer plates 37 and 15, and apertured portions 31c and 31d are to allow entrance of the spindle 6 and a pressure spring plate 38 to be described later.

The movable cover means is in the form of an outer casing member or outer cover 35 with its hinge portions 35a pivotally mounted on the aforesaid shaft 12 to be rotatable relative to the portion 11 of the apparatus. On the front side surface 35c of the outer cover 35 are planted lock pins 36a and 36b. A hook member 40 for the holder 31 is on the left hand side panel of the outer cover. An upper stabilizer plate 37 is fixedly mounted on the ceiling of the outer cover 35 and cooperates with a lower stabilizer plate 15 which is fixedly mounted on the recording and reproducing stage of the portion 11 of the apparatus to prevent vibrations and deformation of the disc 2 as the disc 2 rotates in sandwiched relation therebetween. In this case, the positions of the stabilizer plates 37 and 15 and the disc 2 are so adjusted that n appropriate air layer is formed between the stabilizer plates 37 and 15 and the disc 2. The head 5 passes through and projects outwardly of a slot 15a provided through the wall of the lower stabilizer plate 15.

The pressing means for the center core 3 of the disc 2 is in the form of a leaf spring of a letter "T" shape with its down stroke end 38b fixed to the ceiling of the outer cover 35 by a screw fastener or the like means. Its upper stroke 38a is formed so as to protrude at a central portion downward and is freely supported by locating members 39 which are fixedly mounted on the ceiling of the outer cover 35. The initial value of springing force of the pressure spring plate 38 is previously adjusted and the protruded portion 38a is aligned to the head of the spindle 6.

A coil spring 13 around the aforesaid shaft 12 has its arms placed on the holder 31 and the outer cover 35 respectively so that they are urged to turn in directions to open. Another coil spring 14 around the shaft 12 has its one arm against the portion 11 of the apparatus and its opposite arm against the outer cover 35, thus urging the outer cover 35 to turn in a counterclockwise direction.

With such mechanism, when the magnetic disc cassette 1 is to be loaded, the operator first turns the outer cover 35 about the hinge shaft 12 in the opening direction as illustrated in FIG. 3A with the help of the bias force of the spring 14 until its one end 35b abuts on the rear wall 11a of the housing of the apparatus. During this time, the holder 31 is also turned by the bias force of the spring 13 in a clockwise direction away from the outer cover 35 until it abuts on the hook member 40 in the position of FIG. 3A.

Here, the arrangement of the parts of the lever-and-slider mechanism on the side wall 16 of the apparatus is described. In the opened position of the outer cover 35 and holder 31 as shown in FIG. 3A, as illustrated in FIG. 4A, a hooked portion 18b of the latch lever 18 engages with a pawl 21d of the lock slider 21. Also a bent portion 21c of the first lock slider 21 is in contact with one end of the second lock slider 23. Therefore both of the lock sliders 21 and 23 are set in the rightmost positions with their bias springs 22 and 24 tensioned. Also extensions 21a and 21b of the lock slider 21 and lobes 23a and 23b of the lock slider 23 are all positioned so as to clear the path of movement of the lock pins 36a and 36b of the outer cover 35.

Turning again to FIG. 3A, the operator then inserts the cassette 1 from the opening 31f into the holder 31. When the outer cover 35 is turned about the hinge shaft 12 in the clockwise direction against the bias force of the spring 14, the holder 31 also turns about the hinge shaft 12 in the same direction, reaching a cassette-loaded position of FIG. 3C where the spindle 6 extends through the apertured portion 31c of the holder 31 into the engaging hole at the center of the center core 3 of the disc 2, and the lower stabilizer plate 15 and the upper stabilizer plate 37 also enter through the windows 31b and 31a of the holder 31 to the windows 1b and 1a of the cassette 1 respectively. Upon further movement of the outer cover 35 from the position of FIG. 3C where loading of the cassette 1 is completed in a direction of arrow F to another position of FIG. 3B, the protruded portion 38a of the pressure spring plate 38 of the outer cover 35 advances through the apertured portion 31d of the holder 31 into the interior thereof and moves the center core 3 of the disc 2 along the shaft of the spindle 6 toward the flanged portion 6a thereof. If, at this time, the pushing stroke of the outer cover 35 exceeds the required distance between the center core 3 and the location fringe 6b, the overload is absorbed by the spring plate 38 as it bends.

Figure 3B:
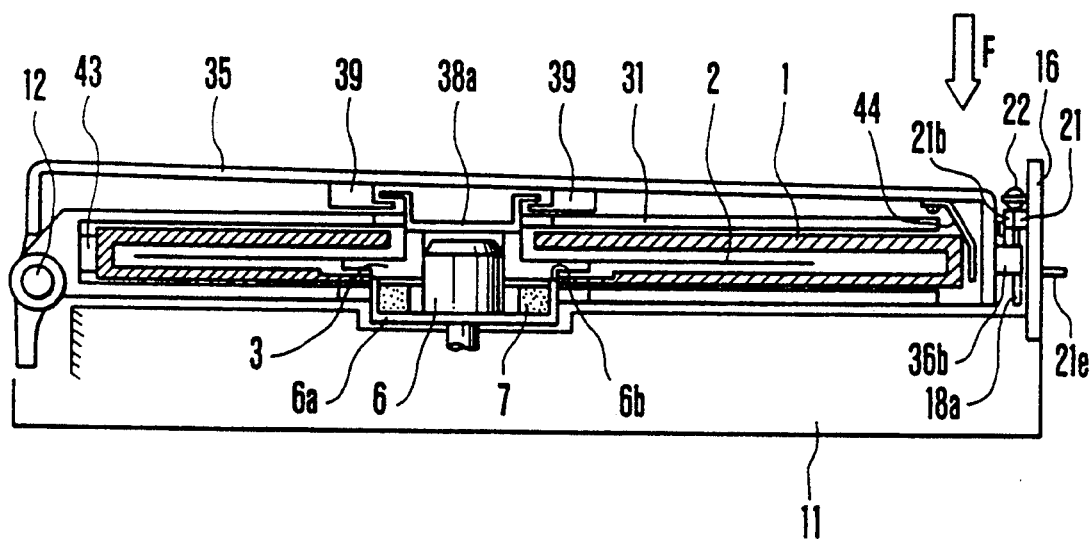
Figure 3C:
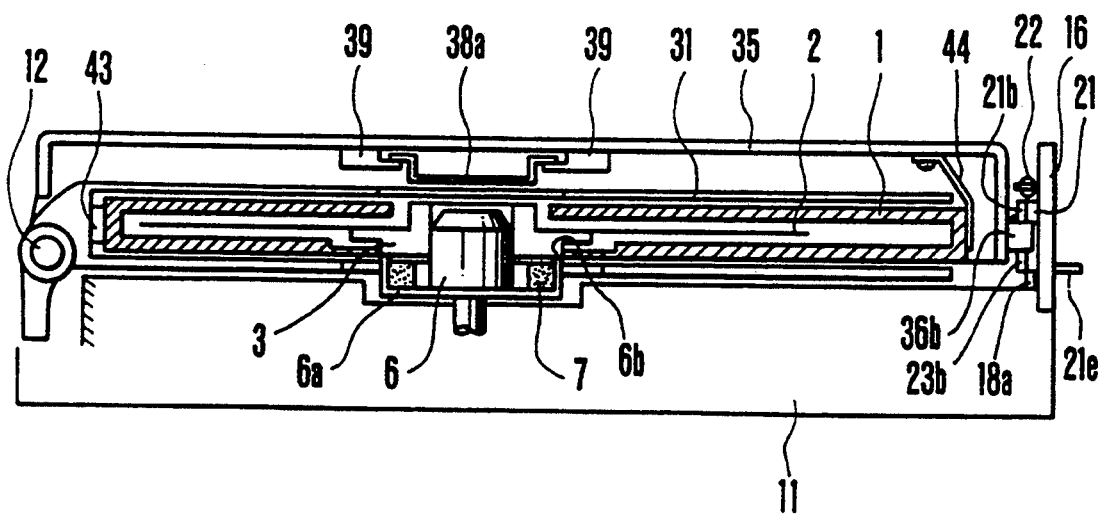
Figure 4A:
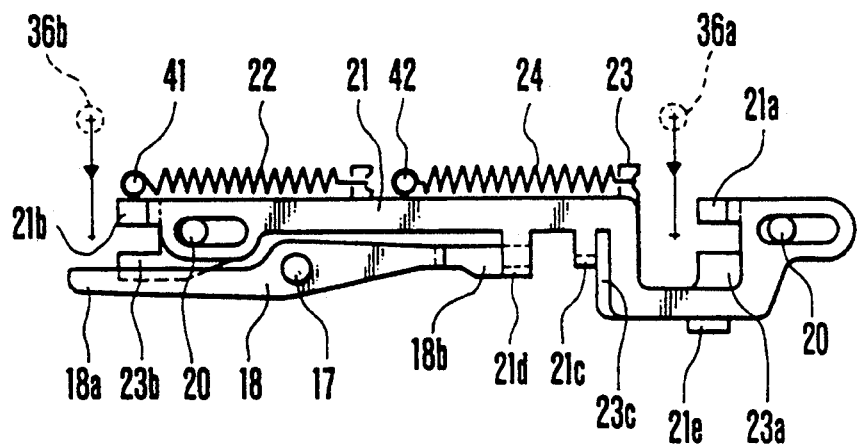
FIGS. 4A, 4B and 4C are elevational views of a cover locking mechanism of FIG. 2 in different operative conditions.
Figure 4B:
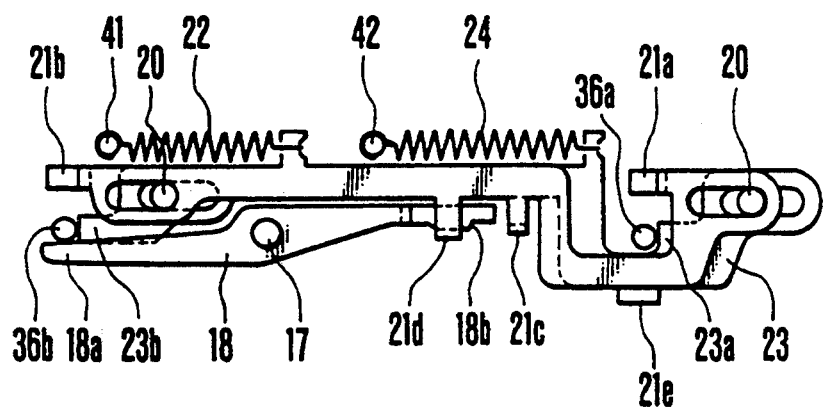
Figure 4C:
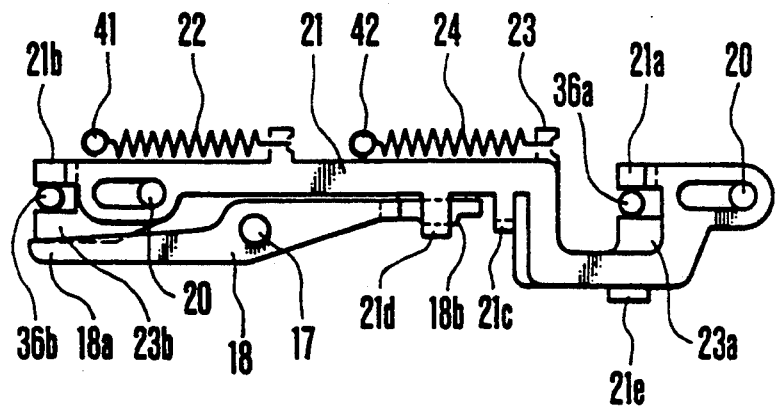

When the outer cover 35 reaches the position of FIG. 3B, as illustrated in FIG. 4B, of the lock pins 36a and 36b planted on the outer cover 35, the pin 36b strikes the latch lever 18 at its tail 18a, thereby the lever 18 is turned about the shaft 17 in a counterclockwise direction against the spring 19 until its hooked portion 18b disengages from the pawl 21d of the lock slider 21. Upon this release from the latching connection, the lock slider 21 runs to the left under the bias force of the spring 22, bringing its extensions 21a and 21b to the above of the lock pins 36a and 36b respectively. It is to be noted here that the other lock slider 23 is left hindered from moving to the left because both or either one of its lobes 23a and 23b are or is barred by both or either one of the lock pins 36a and 36b. After that, when the operator then removes his hand from depressing the outer cover 35, it turns about the hinge shaft 12 in the counterclockwise direction under the bias force of the spring. At this time, however, the outer cover 35 is hindered from moving upward by the lock pins 36a and 36b engaging with the extensions 21a and 21b of the lock slider 21. As the outer cover 35 is, though, allowed to move upward very slightly the lock pins 36a and 36b move away from the path of movement of the lobes 23a and 23b of the second lock slider 23. Then, the slider 23 moves to the left under the bias force of the spring 24 until it abuts against the bent portion 21c of the first lock slider 21. Thus, lobes 23a and 23b lay themselves just under the lock pins 36a and 36b as shown in FIG. 4C. In other words, it is at this point of time that the outer cover 35 is locked or arrested to the portion 11 of the body of the apparatus in the position of FIG. 3C. And, at this time, the protruded portion 38a of the spring plate 38 is taken out of contact with the center core 3 as illustrated in FIG. 3C, leaving the center core 3 surely engaged on the spindle 6 and correctly located by its flanged portion 6a. Under this condition, the disc 2 is driven to rotate through the center core 3 by the rotation of the spindle 6.

Incidentally, when in taking out the cassette 1, the operator needs only to push a knob 21e extending from the lock slider 21 through a slotted opening 16a of the slide wall 16 to the outside rightwardly against the springs 22 and 24 as viewed in FIG. 4C, until the lock slider 21 is caught by the latch lever 18 in the position of FIG. 4A. Thereby, the outer cover 35 and holder 31 are moved by the springs 13 and 14 to the opening position of FIG. 3A.

For note, in FIGS. 3A to 3C, 43 denotes a locating member for the cassette 1 provided on the opposite or bottom inner side of the holder 31 to the opening 31f. In this connection, it should be pointed out that for cooperation with this locating member 43 it is preferred to use a leaf spring 44 fixedly secured to the ceiling of the outer cover 35 and arranged upon closure of the outer cover 35 to push the cassette 1 toward the locating member 43 in order to insure that the cassette 1 is accurately and reliably located.

Now, in the first embodiment described above, since in the loaded position of FIG. 3C, the protruded portion 38a of the spring plate 38 provided on the outer cover 35 is disengaged from the center core 3 of the disc 2, the use of the pressing means gives no adverse effect to the rotation of the disc 2 when recording or reproducing is carried out. In addition to such advantage, for example, since the outer cover 35 is rigidly held in the intermediate or the cassette-loaded position of FIG. 3C by the lock sliders 21 and 23 clamping the lock pins 36a and 36b, even when a shock is given to the outer cover 35 in the fully loaded position of FIG. 3C, said outer cover 35 withstands firmly, thus protecting the disc 2 and center core 3 from that shock. A further feature is that such outer cover 35 can be locked only when the outer cover 35 is pushed down beyond the cassette loading completion position of FIG. 3C to the position of FIG. 3B. Since this excessive motion of the outer cover 35 only can create an action of the aforesaid spring plate 38 that brings the center core 3 of the disc 2 to resting engagement on the spindle 6, it is made possible to insure that the center core 3 is accurately and reliably set on the spindle 6. This produces an additional advantage that the size of the permanent magnet 7 necessary for the flanged portion 6a of the spindle 6 can be reduced remarkably, or that the necessity of using the permanent magnet 7 can be removed.

Here, variations of the above-described first embodiment are possible. For example, the above-described holder 31 may be omitted. If so, the space enclosed with the hinge shaft 12 and the side panel 16 is instead given a framework of shape conformed to the cassette 1. The use of such stationary cassette receiving portion provides a management such that the cassette 1 is loaded in "drop-in" fashion. In this case, it is preferred that the outer cover 35 is provided with, for example, a leaf spring, sponge, or soft rubber arranged on the ceiling thereof so that when the outer cover 35 is locked in the position of FIG. 3C, the cassette is pressed against the portion 11 of the body of the apparatus. After that, the cassette 1 is maintained stationary relative to the portion 11 of the body of the apparatus. It is also preferred in this case to additionally use means for ejecting the cassette 1 from the entrance opening of the portion 1t of the body manually or in automatic response to opening of the outer cover 35.

As has been described in greater detail above, according to the first embodiment of the present invention, an inevitable operation for loading the apparatus with a record bearing medium is made to also serve to effect accurate and reliable coupling of the record bearing medium with the coupling portion of the apparatus, thereby the permanent magnet for magnet chucking is made unnecessary at all, or this necessary attractive force can be reduced. Further, in the normal recording or reproducing mode, no load is given to the record bearing medium and the drive system therefor. Thus, the present invention has achieved a great advance in the art of recording and reproducing apparatus of the character described.

A second embodiment of the present invention will next be described by reference to FIGS. 5 to 10. This second embodiment is in view of the second object of the present invention. That is, this second embodiment is that as soon as loading of the magnetic disc 2 on the spindle has been completed, the magnetic head 5 is automatically moved to a prescribed start position for recording or reproducing, and further rotation of the spindle 6 also starts, so that when a recording or reproducing start signal is given off, a recording or reproducing operation immediately becomes possible. Particularly, for the ramping time of the motor for rotating the spindle 6 is taken into account, to start energization of the disc drive motor soon after the loading of the disc is very advantageous from the standpoint of saving the preparation time.

In FIGS. 5 to 10, the same reference characters have been employed to denote the elements basically similar in construction and arrangement and functions to those shown in FIG. 1 to 4C, and in the following, recitation of the description about them is as far avoided as a better understanding of this embodiment is baffled.

Figure 5:
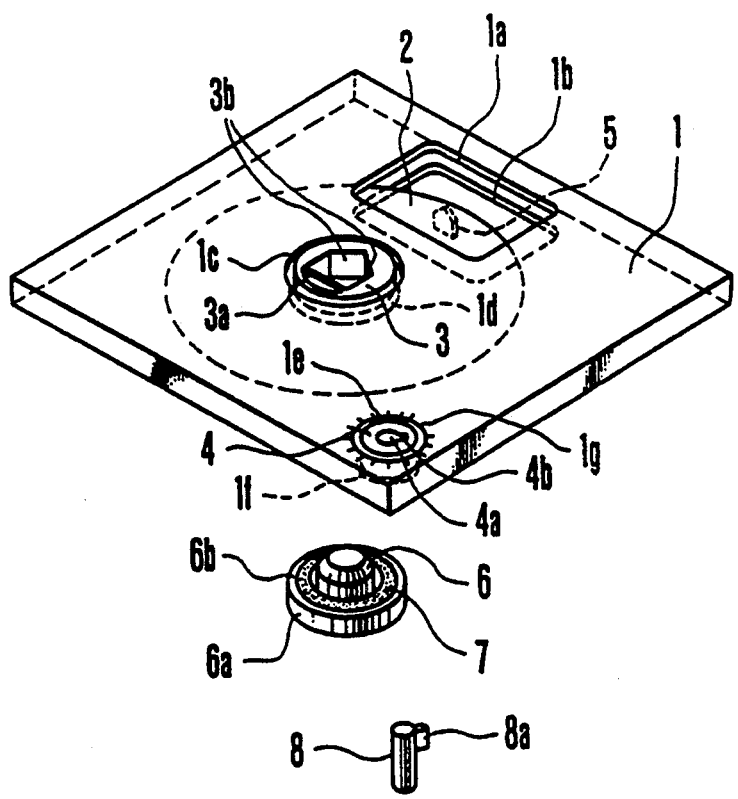
FIG. 5 is a perspective view of a record bearing medium container usable in the second embodiment of the invention along with a rotating drive portion and a counter drive portion of the apparatus.

Referring first to FIG. 5, the cassette 1 further includes a counter 4 as a recorded amount or remaining amount display member having ratchet teeth on the outer periphery thereof with a hole 4a at the center of the area thereof in which is engaged a counter drive connection shaft 8 of the recording or reproducing apparatus and a key groove 4b continuous to the hole 4a. Engaged in this key groove 4b is a key portion 8a of the shaft 8. The ratchet teeth of the counter 4 cooperate with a resilient click stop member (not shown) and have a pitch which is adjusted to one track pitch on the magnetic disc 2. The drive connection shaft 8 is arranged to rotate in response to movement of the magnetic head 5. It is to be noted that the drive connection shaft 8 engages with the counter 4 when the phases of the key portion 8a and the key groove 4b coincide with each other, and that as, at this time, the shaft 8 moves vertically, a switch is turned on and off. The upper and lower panels of the housing of the cassette 1 have round openings 1e and if respectively in coaxial alignment with the counter 4. In the vicinity of the upper opening 1e there is formed a scale 1g indicating recorded track numbers. The counter 4 indicates a track number depending on what gradient in the scale 1g is in registry with the key groove 4b.

Figure 6:
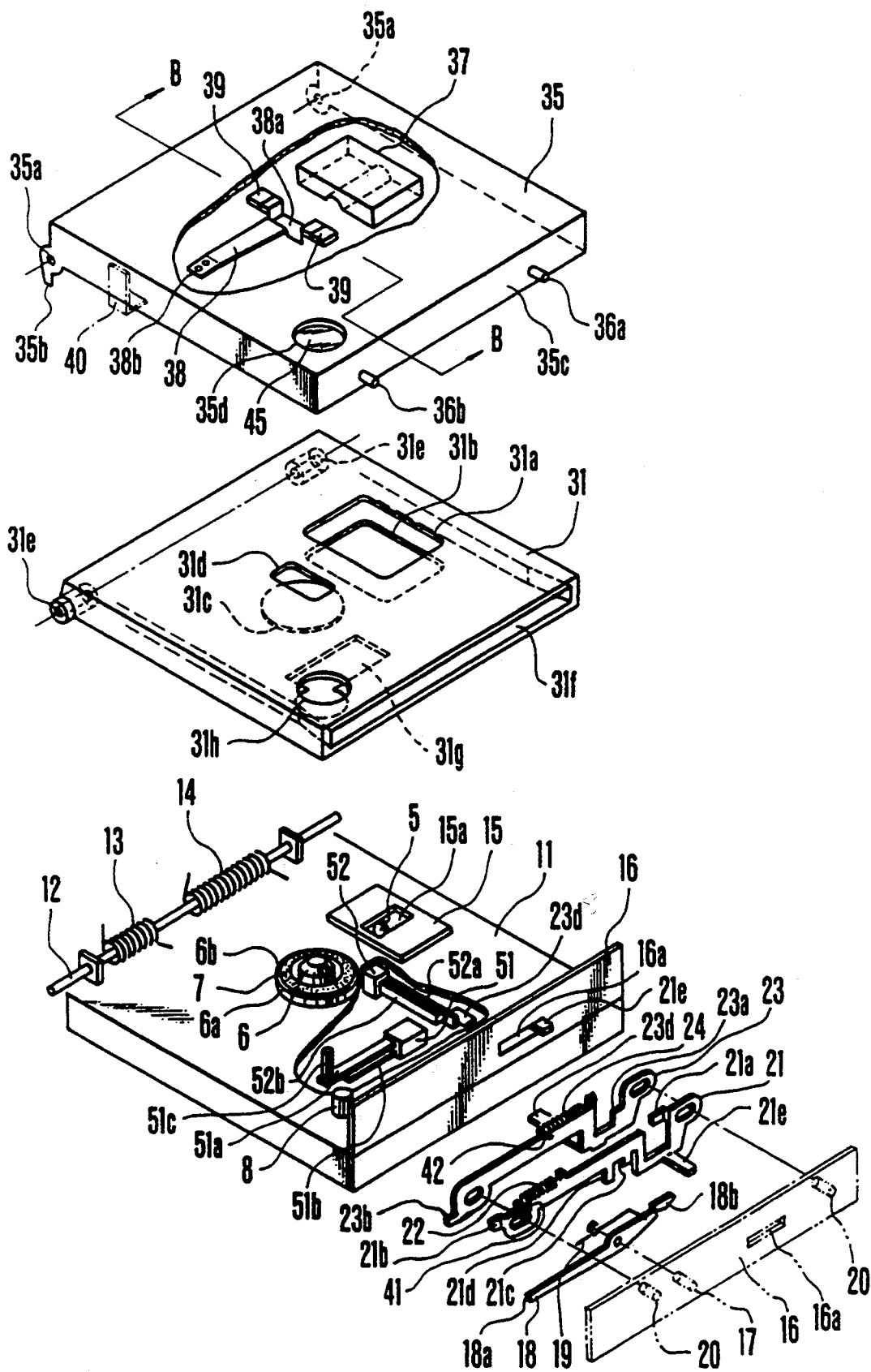
FIG. 6 is an exploded perspective view of the second embodiment of the invention particularly with a cassette loading and sheet setting mechanism.

As shown in FIG. 6, the above-described drive connection shaft 8, similarly to the spindle 6, is positioned as projecting outwardly of the recording or reproducing stage of the portion 11 of the apparatus body.

Under the stage or within the portion 11 there are two switches 51 and 52. The switch 51 is a normally open cassette sensor switch arranged to be closed when the holder 31 reaches a position of FIG. 7B or 7C to be described later corresponding to FIG. 3B or 3C in the aforesaid first embodiment, provided that the cassette 1 is contained in the holder 31, as its contacts 51a and 51b are closed by the lower surface of the cassette 1. The switch 52 is a normally open switch for detecting when loading of the disc (and locking of the outer cover) is completed as an example of the center core pressure release detecting means, and has contacts 52a and 52b arranged to be closed when in a position of FIG. 8C to be described later corresponding to FIG. 4C in the aforesaid first embodiment.

A cutout portion 31g in the lower panel of the holder 31 allows an actuator or pin 51c on the contact 51a of the cassette sensor switch 51 and the drive connection shaft 8 to enter therethrough. A round window 31h in the upper panel of the holder 31 allows for the operator to observe the counter 4 of the cassette 1 together with the scale 1g on the upper panel of the cassette 1. Another round window 35d is formed through the wall of the outer cover 35 in alignment with the window 31h of the holder 31 so that the counter 4 of the cassette 1 and the scale 1g on the upper panel of the cassette i can be observed through the round window 31h of the holder 31 and a protection glass 45 is fixedly fitted in the window 35d.

The other parts are similar in construction and arrangement to those of the aforesaid first embodiment.

Figure 7A:
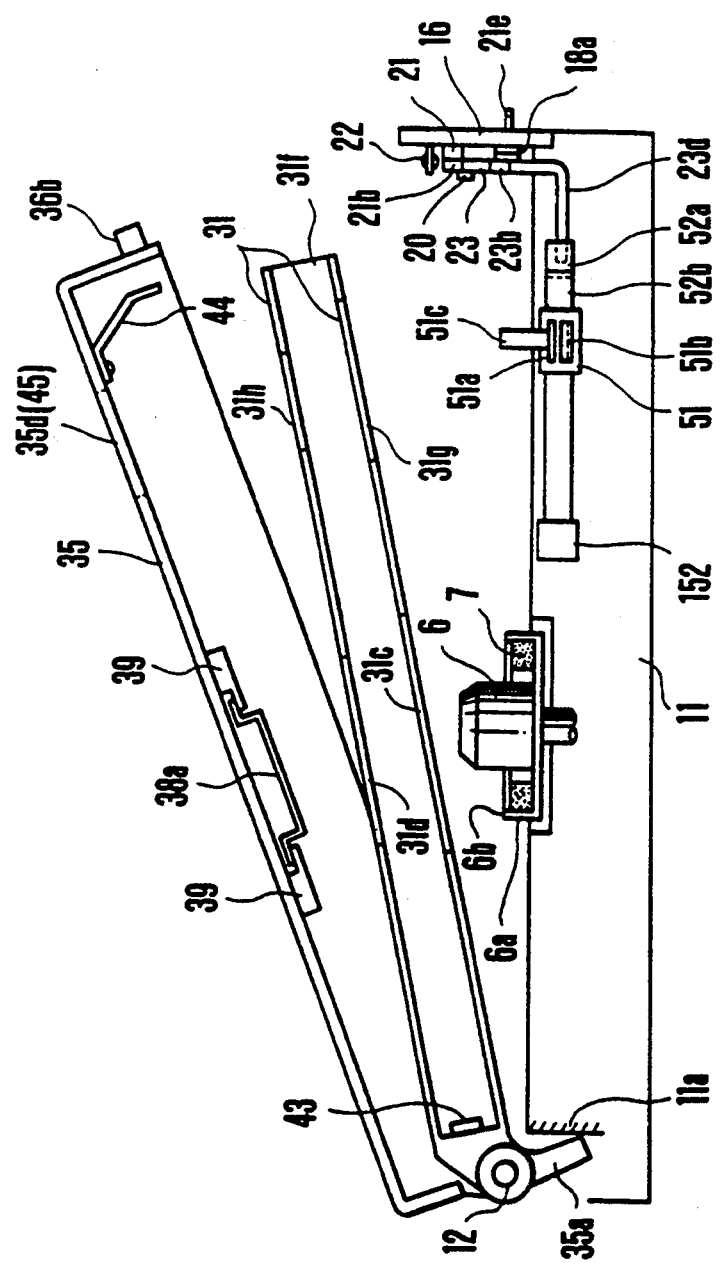
FIGS. 7A, 7B and 7C are cross-sectional views of the mechanism of FIG. 6 taken along a line B—B in various operative conditions.

With such apparatus, when the cassette 1 is to be loaded, similarly to the manner described in connection with the first embodiment, as illustrated in FIG. 7A, the outer cover 35 is turned relative to the portion 11 of the body about the hinge shaft 12 in the counterclockwise direction against the bias force of the spring 14 until its leg 35b abuts against the wall 11a of the housing of the apparatus. Then, after the cassette 1 is inserted into the holder 31, the outer cover 35 is turned about the hinge shaft 12 in the clockwise direction past an intermediate position of FIG. 7C where the loading of the cassette 1 is completed to a final position of FIG. 7B where in a similar manner to that of the first embodiment, the spindle 6 extends through the apertured portion 31c of the holder 31 into the engaging hole at the center of the center core 3, and the lower and upper stabilizer plates 15 and 37 also extend through the cutouts 31b and 31a of the holder 31 into the cutouts 1b and 1a of the cassette 1. Further, it is at this time that the center core 3 is impelled toward the flanged portion 6a of the spindle 6 by the protruded portion 38a of the spring plate 38 provided on the outer cover 35. And, it is also at this time that if the holder 31 contains the cassette 1 as has been described above, the cassette sensor switch 51 is closed as the pin 51c is pushed down by the lower surface of the cassette 1. (Of course, if the cassette 1 is unloaded, the switch 51 remains open).

Figure 7B:
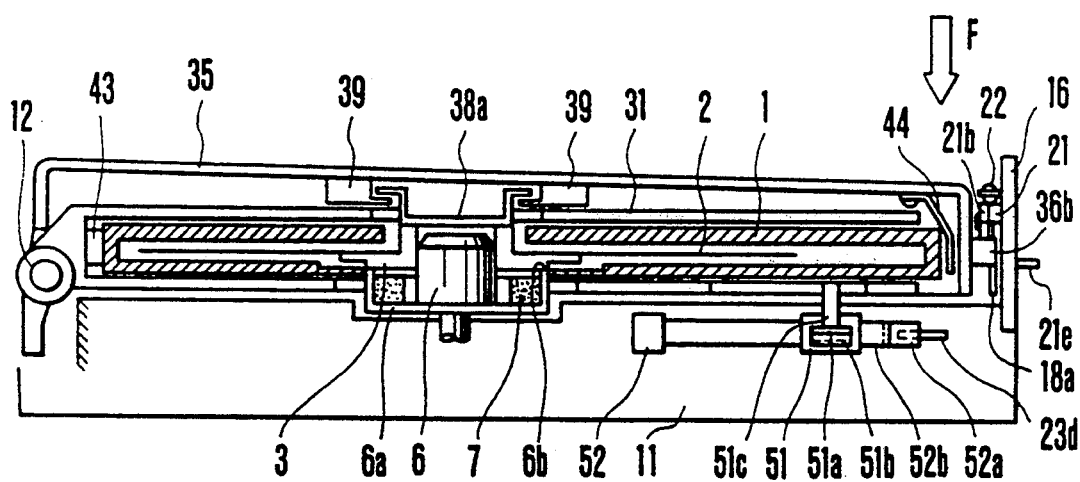
Figure 7C:
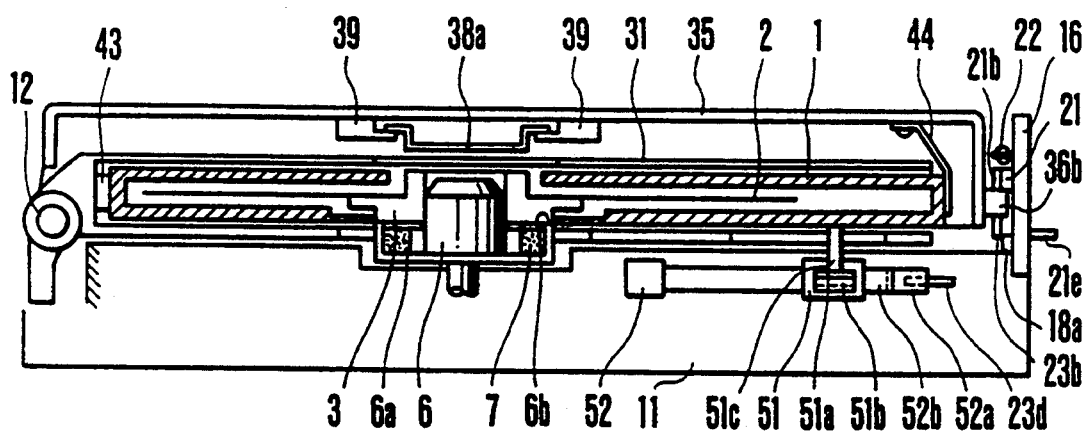
Figure 8A:
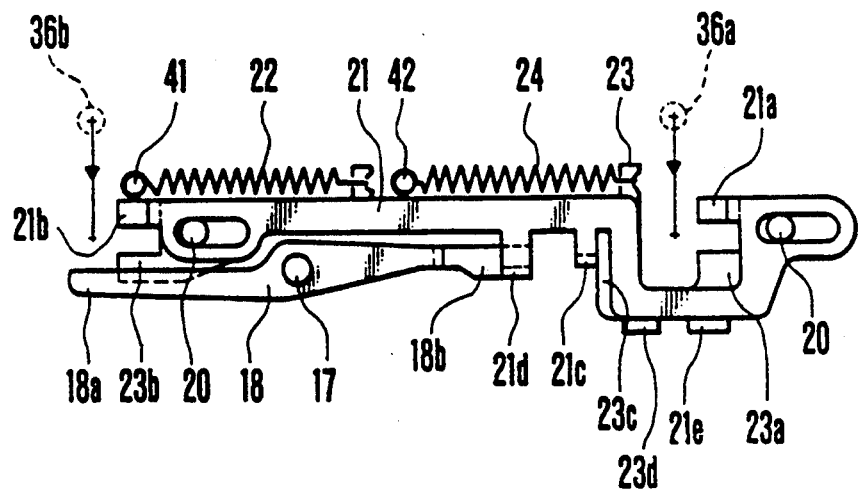
FIGS. 8A, 8B and 8C are elevational views of the cover locking portion of the mechanism of FIG. 6 in various operative conditions.
Figure 8B:
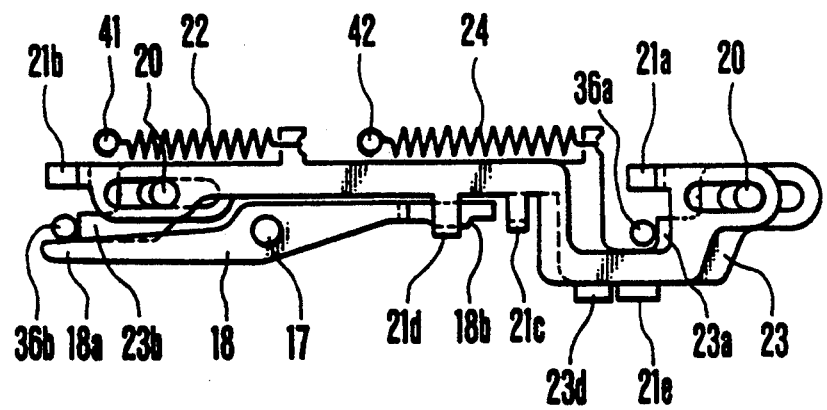
Figure 8C:
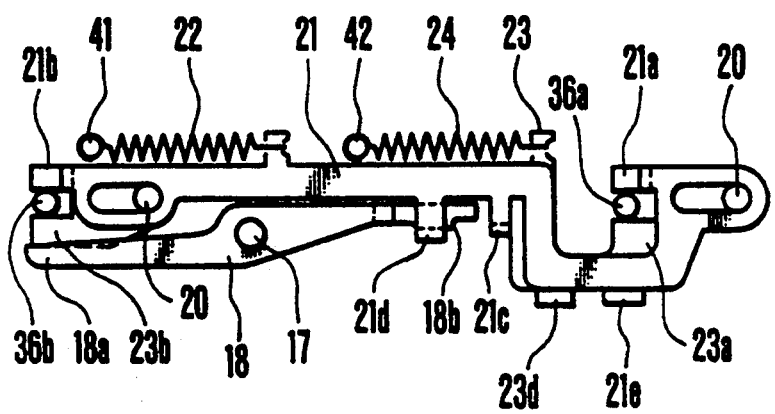

On the other hand, when the outer cover 35 reaches the position of FIG. 7B, as illustrated in FIG. 8B, similarly to the manner of the first embodiment, the lock slider 21 runs to the left by the bias force of the spring 22, so that the extensions 21a and 21b cut off the locus of the lock pins 36a and 36b. After that, when the outer cover 35 is released from the depression, it slightly turns backward or counterclockwise about the hinge shaft 12 by the bias force of the spring 14 until the lock pins 36a and 36b abut on the extensions 21a and 21b respectively, reaching the position of FIG. 7C where the second lock slider 23 then is moved to the left by the bias force of the spring 24 to a position defined by the bent portion 21c of the first lock slider 21, thereby its lobes 23a and 23b are brought into clamping engagement on the lock pins 36a and 36b as illustrated in FIG. 8C. Thus, the outer cover 35 is locked or arrested to the portion 11 of the body in the position of FIG. 7C. It is in this position that the disc loading completion detector switch 52 is closed by the switch control arm 23d of the lock slider 23, and that the spring plate 38 of the outer cover 35 is moved away from the center core 3 as illustrated in FIG. 7C, leaving the center core 3 accurately and reliably set on the spindle 6. Under this condition, the disc 2 is rotated as the spindle 6 rotates.

Incidentally, the cassette 1 can be unloaded as follows. The operator pushes the knob 21e extending sideway from the first lock slider 21 through the slot-like opening 16a of the side panel 16 and projecting outwardly thereof to the right as viewed in FIG. 8C. against the springs this time onward, the counter 4 becomes possible to move. Though not shown here, there is provided a switch having ON or OFF positions taken depending upon when the shaft 8 is just engaged with the counter 4.

The outer periphery of the cam 51 constitutes a camming surface on which lies the cam follower 49. The ratchet gear 52 has its outer periphery formed to a ratchet teeth 52a, and is urged by a return spring 53 hooked between a fixed pin 53a and a pin 52b thereof to turn in a clockwise direction. A stopper 53b is fixedly provided so as to restrict the clockwise rotation of the gear 52 by the spring 53 by abutting on the pin 52b of the gear 52. A control pawl lever 54 as position determining means for the cam 51 and the drive connection shaft 8 is urged by a spring 56 to turn about a shaft 55 in a counterclockwise direction, and its pawl 54a is engageable with one of the ratchet teeth 52a. A drive pawl lever 57 is pivotally mounted on a pin 58 which is mounted to one end of a drive slider 60, and is urged by a spring 59 to turn in a clockwise direction. Its pawl 57a also is engageable with one of the ratchet teeth 52a. The drive slider 60 has its slots 60b engaging with pins 61 and is movable vertically as viewed in the drawing. A spring 62 urges the slider 60 downward, and the downward movement is limited by a stopper pin 65 against which the pawl 57a of the drive pawl lever 57 abuts.

The drive slider 60 has an arm 60a to which is connected an armature 63 of a plunger 64. The parts 46 to 64 constitute a shifting mechanism for the head 5. 22 and 24 until the lock slider 21 is held by the latch lever 18 in the position of FIG. 8A, thereby the lock slider 23 is returned to the initial position where the switch 52 is opened, and the outer cover 35 and the holder 31 are opened by the action of the springs 13 and 14 to the position of FIG. 7A, and at this time the switch 51 is opened.

A shifting mechanism for the magnetic head and a control circuit therefor will next be described by reference to FIGS. 9 and 10.

Figure 9:
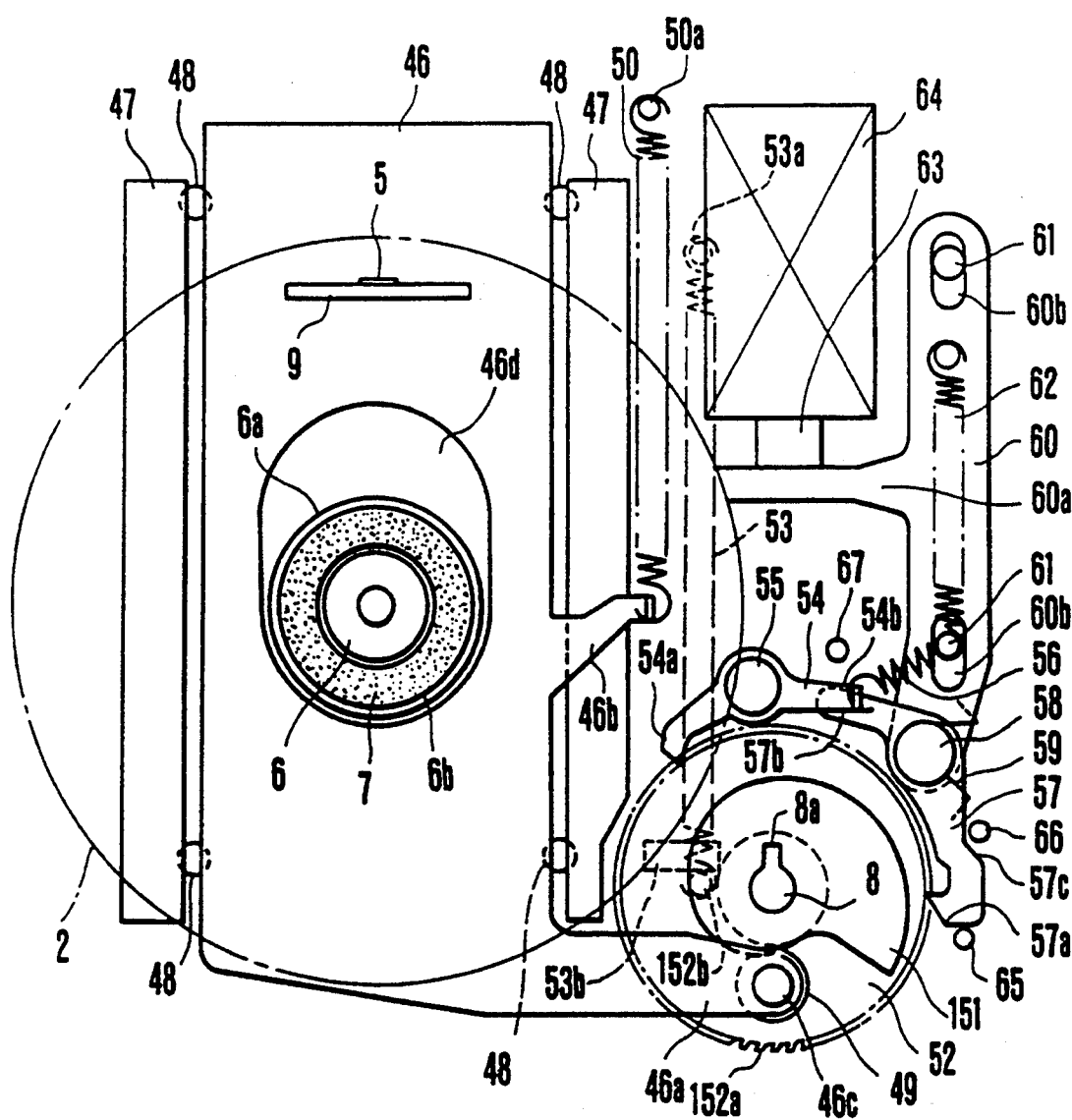
FIG. 9 is a top view of the second embodiment of the present invention particularly with a head shifting mechanism.

Referring first to FIG. 9, 5 is the aforesaid magnetic head fixedly mounted through a base plate 9 to a carrier 46 which is supported through two pairs of ball bearings 48 to guide rails 47, so that the magnetic head 5 moves toward the spindle 6 for rotating the magnetic disc 2. The head carrier 46 has an arm 46a with a cam follower 49 rotatably mounted at the end thereof. A spring 50 whose ends are hooked to a fixed pin 50a and to an extension 46b of the carrier 46 urges the carrier 46 upward as viewed in the drawing. To escape the spindle 6, there is formed a cutout 46d. The aforesaid counter drive connection shaft 8 rotates as a unit with a head position control member or cam 51 and a ratchet gear 52 in concentric relation to each other, and is made also axially movable. A spring (not shown) urges the shaft 8 to project in a direction to engage the counter 4 in the cassette 1. Therefore, before the phase of the key portion 8a of the shaft 8 comes to coincide with that of the key groove 4b of the counter 4, the shaft 8 remains escaped axially downwards. Upon attainment to the coincidence, it moves upward and rightly engages with the counter 4. From With the mechanism of such construction, when the plunger 64 is energized, the armature 63 is attracted, moving the slider 60 upwards as viewed in FIG. 9. This motion is transmitted by the drive pawl lever 57 to turn the ratchet gear 52 by one tooth pitch in the counterclockwise direction against the return spring 53, because the upward movement of the slider 60 is limited by a pin 66 against which a shoulder 57c of the drive pawl lever 57 abuts.

When the current supply to the plunger 64 is cut off, the slider 60 and drive pawl lever 57 return to the illustrated position by the spring 62, leaving the latchet gear 52 in the advanced position with the control pawl lever 54 holding the ratchet gear 52 stationary. The value of lift of the cam 51 for every one tooth pitch of the rotation of the ratchet gear 52 is previously adjusted to one track pitch of movement of the head 5 on the magnetic disc 2. So the head 5 is advanced stepwise from track to track by the carrier 46. Simultaneously, the drive connection shaft 8 also turns by one tooth pitch of the ratchet gear 52 in the counterclockwise direction. If the shaft 8 is at this time in engagement with the counter 4 therefore, the counter 4 also is turned likewise to the same angle of rotation as the ratchet gear 52 turns. And if the pitch of the ratchet teeth of the counter 4 is previously made equal to that of the ratchet gear teeth 52a, the counter 4 can hold itself stationary in an equivalently advanced position by a resilient click stop member (not shown), while the key groove 4b as an index is in registry with the corresponding one of the gradients of the scale 1g on the upper surface of the cassette 1 to the number of tracks the head has scanned.

When to return the head shifting mechanism to the initial position, the operator needs to push the aforesaid knob 21e to the right, thereby a pin 67 is moved downward as viewed in FIG. 9. Such movement of the pin 67 causes the control pawl lever 54 and the drive pawl lever 57 to turn clockwise and counterclockwise respectively as the pin 67 strikes their tails 54b and 57b against the springs 56 and 59, until their pawls 54a and 57a disengage from the ratchet teeth 52a. It is to be noted here that the disengagement of the pawls 54 and 57 from the ratchet gear 52 does not suffice for proceeding the resetting operation of the mechanism of FIG. 9 because the drive connection shaft 8 is yet left engaged with the counter 4 of the cassette 1. (That is, the bias force of the click stop member acting on the counter 4 is stronger than the force of the return spring 53 acting on the ratchet gear 52, and therefore the drive connection shaft 8 cannot rotate in the clockwise direction). Then such rightward movement of the first lock slider 21 in FIG. 8C causes release of the outer cover 35 and holder 31 from the locking connection in the closed position. When they open under the action of the springs 13 and 14 (in the position of FIG. 7A), the counter 4 of the cassette 4 is disengaged from the shaft 8, and the shaft 8 becomes of no load. Therefore, by the springs 53 and 50, the ratchet gear 52, cam 51, drive connection shaft 8, and head carrier 46 are returned to their initial positions where the pin 52b of the gear 52 abuts on the stopper pin 53b. It is to be noted that what position the head 5 takes as the initial position is a position defined as, for example, assuming that the outermost track of the effective recording area of the magnetic disc 2 is the first track, one track pitch outside from that track. Also it is to be understood from the foregoing that in the as-taken-off state of the cassette 1 from the recording or reproducing apparatus, the counter 4 is in positive engagement with the resilient click stop member (not shown) cooperating with the ratchet teeth of the outer periphery thereof, thus storing the last or next indication, that is, the track number. Therefore, this counter 1 also serves as a memory of where the last recorded track or next fresh track is located in the magnetic disc 2 (or how many tracks have been scanned). For the cassette 1 containing a partially recorded magnetic disc 2 is later used for subsequent recording, since the drive connection shaft 8 functions as an actuator for the indexing switch, there is no possibility of occurrence of an overlapping recording on the recorded track or tracks, and it is possible to start the subsequent recording at a fresh track just next to the last recorded track. In this sense, therefore, it is preferable to make such a provision that when the apparatus is switched to the reproducing mode, the drive connection shaft 8 is automatically rendered inoperative.

Figure 10:
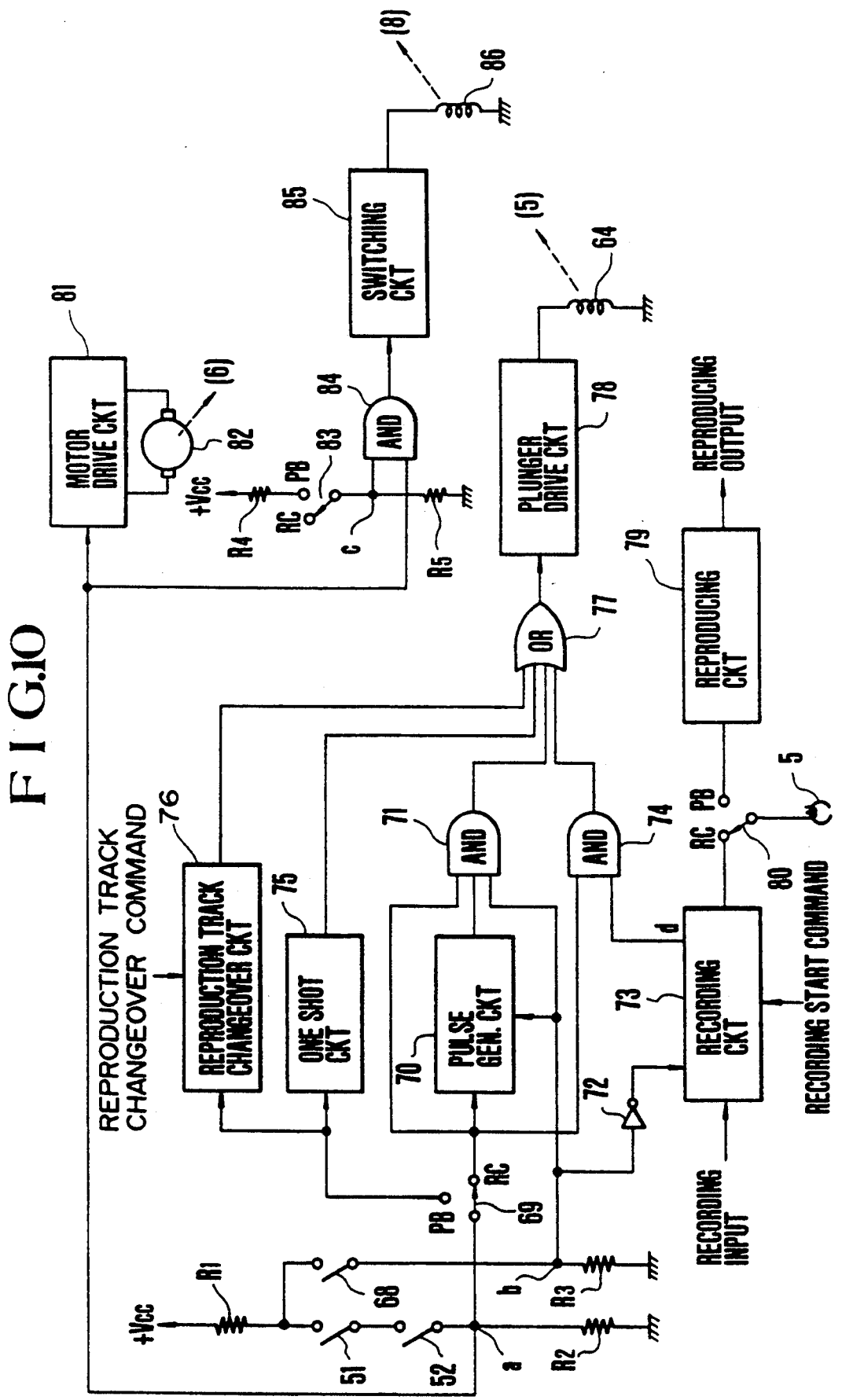
FIG. 10 is an electrical circuit diagram, partly in block form, of the second embodiment of the invention particularly with a control circuit for the head shifting mechanism and an electrical motor for rotation of the disc.

Referring to FIG. 10, a control circuit for the aforesaid head shifting mechanism and a disc drive motor will next be described.

The cassette sensor switch 51 and the loading completion detecting switch 52 are connected to constitute a series circuit together with resistors R1 and R2 across a power source (+Vcc). A drive connection shaft-and-counter engagement detecting switch 68 for detecting when the drive connection shaft 8 engages with the counter 4 of the cassette 1 is a normally open switch of which the arrangement, though not illustrated in detail, is such that, for example, when the drive connection shaft 8 is out of engagement with the counter 4, as it is in downward projection the closure results, and when both come into engagement, the opening results by self-consistency, and is connected in series to the resistor R1 and a resistor R3. A changeover switch 69 is connected to a point "a" on connection between the switch 52 and the resistor R2, and is arranged so that when in the recording mode, an RC position is taken, and when in the reproducing mode, a PB position is taken. A pulse generator circuit 70 responsive to a signal of high level from the terminal RC of the switch 69 produces a train of head shifting pulses with a predetermined frequency and responsive to lowering of the potential at the conjunction point "b" between the switch 68 and the resistor R3 stops production of said pulses. An AND circuit 71 has three inputs which are connected to the output of the pulse generator circuit 70, the terminal RC of the switch 69 and the aforesaid conjunction point "b" respectively. An inverter 72 inverts the potential of the aforesaid conjunction point "b". A recording circuit 73 is enabled to record by the high level output of the inverter 72, and operates in such a manner that when a recording command is given, a part of the input signal for recording (for example, in the case of the still video recorder, for one field or one frame) is applied to the head 5 by which it is recorded on the magnetic disc 2, and when the recording of said signal part finishes, a deactuating signal "d" is produced. A second AND circuit 74 has two inputs which are connected to the terminal RC of the aforesaid switch 69 and the output "d" of the aforesaid recording circuit 73. A one-shot circuit 75 (monostable multivibrator) responsive to high level signal from the terminal PB of the switch 69 produces a single pulse. Likewise the high level signal from the terminal PB of the switch 69 enables a reproducing track changeover circuit 76 to operate in such a manner that when a reproducing track changeover command is given, a head shift pulse for changeover of the reproducing track is produced. An OR circuit 77 has four inputs which are connected to the outputs of the AND gate circuits 71 and 74, one-shot circuit 75 and the reproducing track changeover circuit 76 respectively. A plunger drive circuit 78 responsive to the head shift pulse from the OR circuit 77 drives or energizes the plunger 64 of FIG. 9.

A reproducing circuit 79 reproduces the recorded signals on the disc 2 through the head 5. A changeover switch 80 is arranged to connect the head 5 to the output of the recording circuit 73 when in the recording mode (RC), and to connect the head 5 to the input of the reproducing circuit 79 when in the reproducing mode (PB), and cooperates with said changeover switch 69.

A motor drive circuit 81 responsive to high level potential at the aforesaid conjunction point "a", initiates an operation of a disc rotating motor 82 for rotating the aforesaid spindle 6. It is to be noted that when to perform recording/reproducing of still video signals, according to NTSC system, the motor drive circuit 81 allows the motor 82 to rotate at a constant speed of 3,600 or 1,800 r.p.m. Thereby it becomes possible to record or reproduce the video signal of one field or one frame in one circular of track on the disc 2.

A changeover switch 83 is arranged to cooperate with the aforesaid changeover switches 69 and 80, to open when in the recording mode (RC), and to close when in the reproducing mode (PB), and is connected in series to resistors R4 and R5 across the power source (+Vcc). A third AND gate 84 has two inputs which are connected to the junction point "a" and a junction point "c" of the switch 83 and the resistor R5. A switching circuit 85 is arranged to energize a plunger 86 only when the output of the AND circuit 84 is of high level. It is to be noted here that the plunger 86 is provided for controlling the engaging and disengaging operation of the drive connection shaft 8 and the counter 4 through a mechanism (not shown) in such a way that when current is supplied, the drive connection shaft 8 is held in the downwardly retracted position so that the shaft 8 and the counter 4 are maintained out of engagement independent of whether or not the key portion 8a and the key groove. 4b are coincident in phase with each other, thereby the counter 4 is rendered inoperative. Therefore, with the plunger 86 de-energized, only when the phase of the key portion 8a of the drive connection shaft 8 comes to coincidence with that of the key groove 4b of the counter 4, the drive connection shaft 8 is allowed to engage with the counter 4. It is to be noted that as the engagement control mechanism for the drive connection shaft 8 and the counter 4 using such plunger 86 mention may be made of that disclosed in the embodiments of Japanese Patent Application No. SHO 58-132540. This is valid also for the aforesaid engagement detecting switch 68.

The operation of the circuit of FIG. 10 is as follows. When in the recording mode, the three changeover switches 69, 80 and 83 each are connected to the respective RC terminals, thereby the output of the AND circuit 84 is always maintained at low level. Responsive to this, the switching circuit 85 supplies no current to the plunger 86. Therefore, it becomes possible that when the phase of the key portion 8a comes to coincidence with that of the key groove 4b of the counter 4, the drive connection shaft 8 engages the counter 4. Then, as has described in connection with FIGS. 7 and 8, the cassette i is loaded, and the center core 3 of the disc 2 is set on the spindle 6, at this point of time, the switches 51 and 52 are both turned on so that the potential at the conjunction point "a" changes to high level. Responsive to this, the motor drive circuit 81 starts rotation of the motor 82, and therefore rotation of the disc 2.

On the other hand, when the potential at the conjunction point "a" becomes high, the pulse generator circuit 70 starts producing head shift pulses. Since, at this time, however, the head 5 is in a reset position apart from the first track of the disc 2 outward by one more track pitch as is resulted in connection with the ejecting operation as has been described above, the drive connection shaft 8 has a different phase of the key portion 8a from that of the key groove 4b of the counter 4. Therefore, the drive connection shaft 8 is in the downwardly retracted position where the switch 68 is closed. Therefore, the potential at the junction point "b" is of high level at which the pulses produced from the pulse generator circuit 70 are passed through the AND circuit 71 and OR circuit 77 to the plunger drive circuit 78. In synchronism with the pulses from the OR circuit 77, the plunger drive circuit 78 energizes the plunger 64 so that the head 5 and the drive connection shaft 8 are moved step by step. As the phase of the key portion 8a coincides with that of the key groove 4b of the counter 4 on the way of rotation of the shaft 8, the shaft 8 engages the counter 4 and thus the switch 68 opens, thereby the potential at the junction point "b" is changed to low level. Therefore, the supply of the pulses to the AND circuit 71 is cut off, and the pulse generator circuit 70 is stopped from producing pulses. Thus, the head 5 is stopped in response to engagement of the drive connection shaft 8 with the counter 4. This implies that as has been mentioned above, the position of the head 5 is automatically adjusted to that of the tracks which is memorized on the counter 4.

Such change of the potential at the junction point "b" to low level also causes change of the output of the inverter 72 from low to high level. Therefore, the recording circuit 73 is enabled to record. If a record start command is then given by operating a recording switch (not shown), a part of the input signal is applied through the switch 80 and head 5 to the first fresh track on the disc 2. At the termination of this recording operation, the recording circuit 73 produces a signal "d". Responsive to this, the AND circuit 74 produces a pulse which is then applied through the OR circuit 77 to the plunger drive circuit 78, and the plunger drive circuit 78 energizes the plunger 64 so that the head 5 is shifted to the next track. Of course, along with this, the drive shaft 8 is turned one step so that the next track number is indicated by the counter 4. Such procedure repeats itself each time the record start command is given.

Next when in the reproducing mode, the changeover switches 69, 80 and 83 are each moved to the PB position. As the loading of the cassette 1 and the setting of the disc 2 on the spindle 6 have been completed, the switches 51 and 52 are closed and the potential at the junction point "a" changes to high level. As a result, similarly to the recording mode, the motor 82 rotates. And, since the output of the AND circuit 84 becomes high level, the switching circuit 85 energizes the plunger 86. From this time onward, therefore, the drive connection shaft 8 is maintained out of engagement with the counter 4. Since this also causes the switch 68 to be maintained closed, the output of the inverter 72 is maintained at low level. Therefore, the recording circuit 73 can no longer operate.

On the other hand, as the closure of the switches 51 and 52 changes the potential at the junction point "a" to high level, when the terminal PB of the switch 69 changes to high level, the one-shot circuit 75 produces one pulse which is applied through the OR circuit 77 to the plunger drive circuit 78. Then, the plunger drive circuit 78 responsive to this one pulse, energizes the plunger 64 once, thereby the head 5 is advanced from the aforesaid reset position to the first track in the recording area of the disc 2. In this state, therefore, the signal recorded in the first track is reproduced through the head 5, the switch 80 and the reproducing circuit 79. It is to be noted that when the potential at the junction point "a" becomes high level, this enables the reproducing track changeover circuit 76 to operate. In this state, therefore, when a track changeover switch (not shown) is operated to produce a reproducing track changeover command, the aforesaid changeover circuit 76 produces a head shift pulse which is then applied through the OR circuit 77 to the plunger drive circuit 78. Responsive to this pulse the plunger drive circuit 78 energizes the plunger 64. Thus, the head 5 is shifted to the desired track.

It will be understood from the foregoing that in this second embodiment, as soon as the magnetic disc 2 is set on the spindle 6, the magnetic head 5 is moved to a prescribed position from which a recording or a reproducing starts, and rotation of the spindle 6 also starts, so that just when a recording or reproducing start command is given, a recording or reproducing operation can be initiated. Thus, the apparatus is very convenient. Particularly upon consideration of the long time necessary for the motor 82 to increase the speed of rotation of the spindle 6 to a certain level, it is very advantageous to start rotation of the motor 82 soon after the disc has been loaded from the standpoint of reducing the time consumption.

It is to be noted in connection with the circuit of FIG. 10 that the reason why the cassette sensor switch 51 is provided in the series circuit with the disc loading completion detector switch 52 is that only when the cassette 1 is contained in the holder 31, the motor 82 and the head 5 become possible to operate. If it is not necessary to take such core, the switch 51 may be omitted.

As has been described in greater detail above, according to the second embodiment of the present invention, the recording or reproducing apparatus using rotary type record bearing medium, and particularly the recording or reproducing apparatus in which the record bearing medium is used in such a way that its engaging portion is coupled with the drive portion of the rotating drive means, are made to feature that as soon as accurate and reliable setting of the record bearing medium on the rotating drive member has been established, adjustment of the position of the recording or reproducing head is put into control in order to speed up the recording or reproducing. This capability gives such recording or reproducing apparatus a great advantage.

Next described is a third embodiment of the present invention by reference to FIGS. 11 to 13C. This embodiment is made in view of the third object of the present invention and concerns, in particular, with a cassette ejecting mechanism and a foolproof mechanism for the ejecting mechanism.

For note, in FIGS. 11 to 13C, the same reference characters have been employed to denote the elements basically similar in construction and arrangement and function to those shown in FIGS. 1 to 8C. In the following, therefore, a more explanation about them is made as short as possible provided a better understanding of this embodiment is not baffled. Also in this embodiment, as will be understood from FIG. 12, a lock mechanism for the outer cover 35 has the same construction and arrangement of the elements as those in the above-described first embodiment (therefore, basically the same as those in the second embodiment). For this reason, illustration of said lock mechanism alone is omitted, and instead reference will be made to FIGS. 4A, 4B and 4C as necessity arises in the following description.

Figure 11:
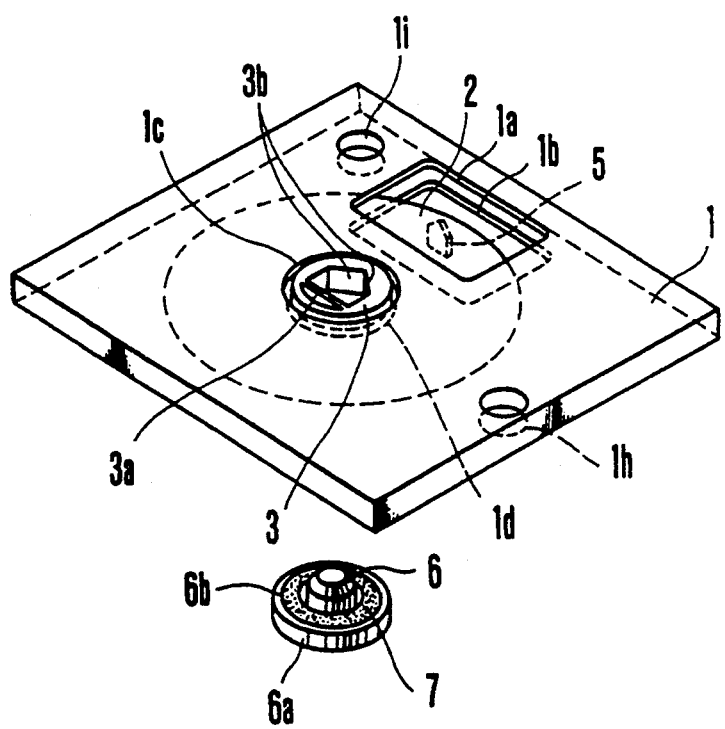
FIG. 11 is a perspective view of a record bearing medium container usable in the third embodiment of the invention along with a coupling portion of the apparatus.

Referring first to FIG. 11, the magnetic disc cassette 1 has location holes 1$h$ and 1$i$. When the cassette 1 is loaded on the recording or reproducing apparatus, location pins (87 and 88 in FIG. 12) enter the respective location holes 1$h$ and 1$i$, thereby locating of the loaded cassette 1 is carried out.

In FIGS. 12, 87, 88 and 89 are pins fixedly mounted on the recording or reproducing stage in the portion 11 of the apparatus body. Of these, the pins 87 and 88 when engaged in the location holes 1$h$ and 1$i$ of the cassette 1 as has been described in connection with FIG. 11 determine the position of the cassette 1 relative to the recording or reproducing stage, and flanged portions 87$a$ and 88$a$ of the pins 87 and 88 and the upper surface of the pin 89 define even the height of the cassette 1 from the platform of the recording or reproducing stage.

131 is a cassette holder corresponding to the cassette holder 31 of FIGS. 2 and 6, the holder 131 is rotatably mounted about the hinge shaft 12 engaging its hinge portion 131$e$ relative to the portion 11 of the body. The right hand side of the holder 131 is provided with an opening 131$f$ for receiving the cassette 1, and the cassette 1 is inserted and extracted from this opening 131$f$. A window 131$a$ provided in the holder 131 is for allowing the upper stabilizer plate 37 to enter, and an apertured portion 131$c$ is for allowing a protruded portion 38$a$ of the pressure spring plate 38 to enter.

132 is a pushing lever as the cassette ejecting means provided on the upper surface of the holder 131 and urged by a spring 134 to turn about a shaft 133 provided on the holder 131 in a clockwise direction (cassette ejecting direction). A pin 132$a$ provided on the lower surface of the end portion of the pushing lever 132 extends through a slot 131$b$ of the holder 131 into the interior of the holder 131. Therefore, when the cassette 1 is inserted into the holder 131, one side of the cassette 1 abuts on the pin 132$a$ of the lever 132. Upon further depression of the cassette 1, as the pin 132$a$ is pushed, the pushing lever 132 is turned in the counterclockwise direction while charging the spring 134. Therefore, when the cassette 1 is fully inserted into the holder 131, it is biased by the spring 134 to always move to the right as viewed in FIG. 12.

151 is a holding slider provided on the upper surface of the holder 131. The holding slider 151 is laterally movable as is guided by two pins 153 planted on the holder 131, and is urged by a spring 155 to the right as viewed in the drawing. One end 151$a$ of the holding slider 151 when in the position of FIG. 12 applies pressure to the tail end 152$b$ of a latch lever 152 to be described later, and the opposite end 151$b$ is bent downward to extend through a slot 131$d$ of the holder 131 into the interior of the holder, so that when the cassette 1 is inserted into the holder 131, the opposite end 151$b$ abuts on its rear end portion. And, at the time when the cassette 1 is fully inserted into the holder 131, the holding slider 151 is moved to the left as viewed in the drawing, thereby its one end 151$a$ is removed from pressing the tail end 152$b$ of the latch lever 152.

152 is a latch lever as an example of the latch means for preventing ejection and is provided on the upper surface of the holder 131. The latch lever 152 is rotatable about a shaft 156 provided on the holder 131, and is urged by a leaf spring 154 in a clockwise direction. A free end latch portion 152$a$ of this latch lever 152 is bent downward so as to enter the opening portion 131$f$ of the holder 131 so that when one end 151$a$ of the holding slider 151 is in release from pressing the tail end 152$b$ of the latch lever 152, the free end latch portion 152$a$ of the latch lever 152 positions itself in the opening portion 131$f$ of the holder 131 to engage one side surface of the cassette 1. On the contrary, when in the position of FIG. 12 where one end of 151$a$ of the holding slider 151 presses the tail end 152$b$ of the latch lever 152 the free end latch portion 152$a$ is retracted from the opening portion 131$f$ of the holder 131 so that it does not engage the cassette 1.

Figure 13A:
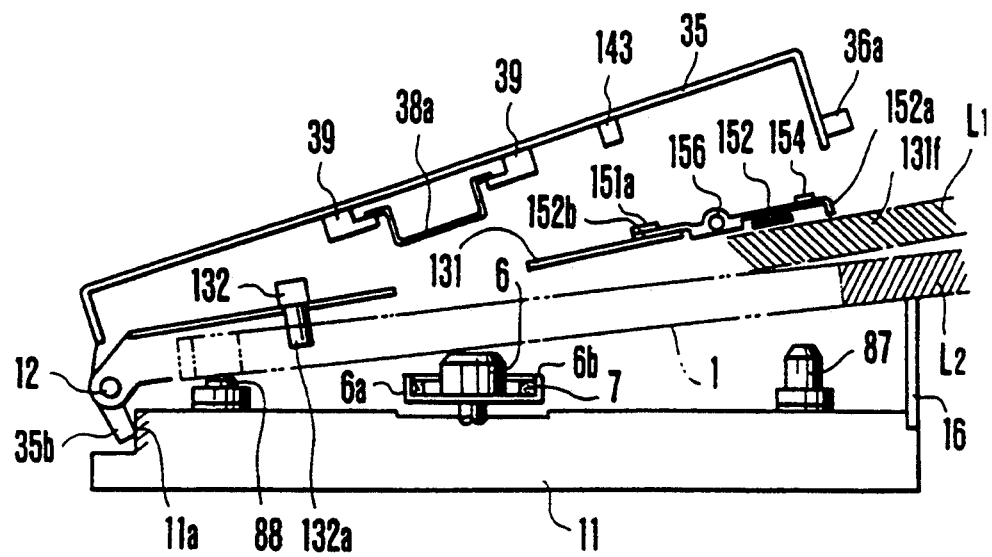
FIGS. 13A, 13B and 13C are cross-sectional views taken along a line C—C of FIG. 12 in various operative conditions.
Figure 13B:
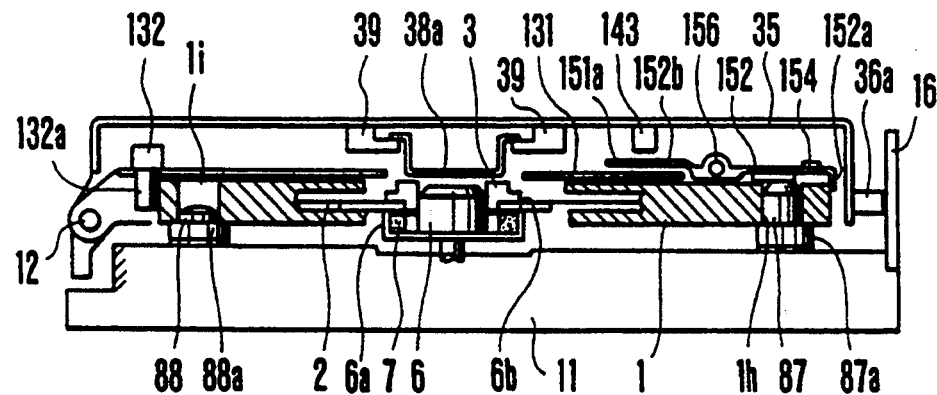
Figure 13C:
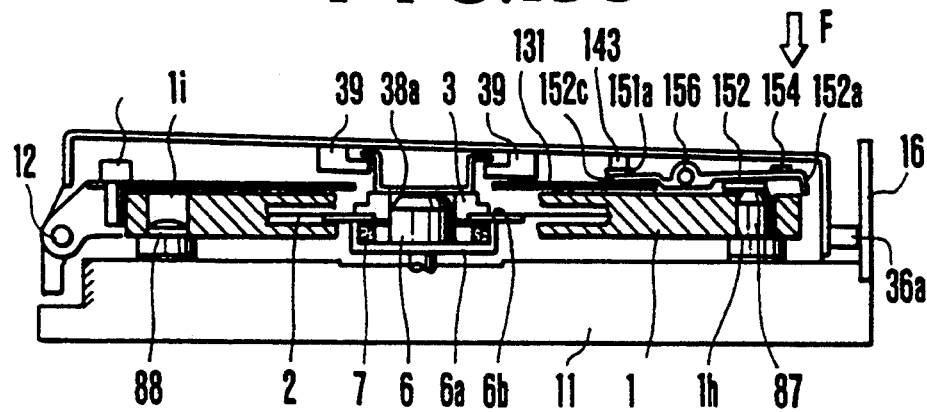

143 is a release pin planted on the ceiling portion of the outer cover 35, and its free end portion presses the tail portion 152$c$ of the latch lever 152 when the outer cover 35 is further pushed beyond the cassette loading completion position of FIG. 13B as illustrated in FIG. 13C, thereby the latch lever 152 is turned in the counterclockwise direction against the bias force of the leaf spring 154.

The other features than the above are similar to those described in connection with the first and second embodiments.

With the mechanisms of such construction, when to load the cassette 1, as illustrated in FIG. 13A, the operator turns the outer cover 35 with the help of the spring 14 about the hinge shaft 12 relative to the portion 1$i$ of the body in the counterclockwise direction to the open position. Since, in this state, the latch lever 152 has its tail end 152b pressed by one end 151a of the holding slider 151, its latch portion 152a is outside the insertion or ejection path L1 of the cassette 1. Therefore, the cassette 1 is not hindered from entering and exiting. Therefore, in this state, the cassette 1 can be inserted through the opening portion 131f of the holder 131 into the interior of the holder 131. At the time when the insertion of the cassette 1 has been completed, its rear end portion pushes the holding slider 151 at the opposite end portion 151b, thereby its one end 151a is moved to the left as viewed in FIG. 13A to release the tail end 152b of the latch lever 152 from the pressure. Therefore, the latch lever 152 is turned about the shaft 156 in the clockwise direction by the leaf spring 154 so that its free end latch portion 152a holds the cassette 1 in the latching position. That is, the cassette 1 is hindered from ejecting. It is to be noted that though the holding slider 151 tends to return to the right under the action of the spring 155, as illustrated in FIG. 13B, the tail end 152b of the latch lever 152 and one end 151a of the holding slider 151 contact with each other at their side edges thereof so that the holding slider 151 is hindered from moving to the right.

In this state, when the outer cover 35 is turned about the hinge shaft 12 against the bias force of the spring 14 in the clockwise direction, the holder 131 also turns about the hinge shaft 12 in the same direction. In the position corresponding to the cassette loading completion position of FIG. 13B, the pins 87 and 88 enter the respective holes 1h and 1i of the cassette 1, thereby its locating is carried out. At the same time, the lower surface of the cassette 1 abuts on the flanged portions 87a and 88a of the pins 87 and 88 and the top surface of the pin 89 so that its height is determined. Also in this cassette loading completion position, the spindle 6 enters the engaging hole at the center of the center core 3 of the disc 2, and the lower stabilizer plate 15 and the upper stabilizer plate 37 also enter the cutout portions 1b and 1a of the cassette 1.

Then, the outer cover 35 is further depressed in a direction of arrow F from the cassette loading completion position shown in FIG. 13B to a position as illustrated in FIG. 13C, thereby the protruded portion 38a at the top of the spring plate 38 arranged on the ceiling portion of the outer cover 35 enters through the opening portion 131c of the holder 131 into the interior of the holder 131 and presses the center core 3 against the flanged portion 6a of the spindle 6. 35 and the holder 131 are returned to the position shown in FIG. 13A.

Since, in this case, the cassette 1 is already released from the latching connection with the latch lever 152, the cassette 1 is expelled to the outside of the holder 131 by the lever 132 under the action of the bias force of the spring 134. In this case, if the path of the outward movement of the cassette 1 is cleared as indicated at L2 in FIG. 13A just before the cassette 1 is released from blocking by the location pin 88, for example, it is possible to avoid interference of the cassette 1 with the side panel 16 when it is expelled.

As has been described in greater detail above, according to the third embodiment of the present invention, the record bearing medium is released from ejection prohibiting connection with the ejection prohibiting means in response to the essential operation of loading the record bearing medium on the apparatus, thereby giving an advantage that there is no need to use a complicated linking mechanism, and that because the aforesaid releasing is effected after the setting of the record bearing medium on the prescribed location has been completed, there is no need to provide an adjusting mechanism for establishing a fine timing relationship.

On the other hand, at this time, the top of the pin 143 planted on the ceiling portion of the outer cover 35 pushes the tail portion 152c of the latch lever 152 downward. As a result, the latch lever 152 is turned about the shaft 156 in the counterclockwise direction, thereby the cassette 1 is released from the latching connection with the free end latch portion of the latch lever 152, that is, allowed to eject.

Such counterclockwise movement of the latch lever 152 also causes the holding slider 151 to disengage with its one end 151a from the tail end 152b of the latch lever 152 which in turn causes rightward movement of the holding slider 151 under the action of the spring 155. Therefore, its one end 151a again pushes the tail end 152b of the latch lever 152. Thus the cassette 1 is maintained in the released position from the latching connection with the latch lever 152.

In this state, when the outer cover 35 is released from depression, likewise as in the first and second embodiments, as illustrated in FIG. 4C, the pins 36a and 36b are clamped by the extensions 21a and 21b of the lock slider 21 and lobes 23a and 23b of the lock slider 23 respectively so that the outer cover 35 is rigidly held relative to the portion 11 of the body.

On the other hand, when to take out the cassette 1, the operator needs to push the knob or bent portion 21e of the lock slider 21 projecting outwardly of the slot-like opening 16a of the side panel 16 of the portion 11 of the body to the right as viewed in FIG. 4C against the springs 22 and 24 until the lock slider 21 is latched by the latch lever 18 in the position of FIG. 4A, thereby the outer cover

What I claim:
1. An apparatus for recording and/or reproducing information on and/or from a disc-shaped recording medium housed in a cassette, comprising:
  (a) recording or reproducing means for recording and/or reproducing the information on and/or from said recording medium;
  (b) rotary driving means for engaging an engaging part formed on said recording medium and for rotating said recording medium;
  (c) cassette holding means movable from a first position where said cassette holding means can receive said cassette to a second position where said cassette can engage with said rotary driving means;
  (d) pressing means having a pressing part for pressing the engaging part of said recording medium, wherein as said recording medium is moved by said cassette holding means from said first position to said second position, said pressing part is caused to come into contact with said engaging part and said pressing part is pressed against said engaging part under the action of a pressing force of said pressing means to press said engaging part onto said rotary driving means to mount it thereon, and said pressing force of said pressing means is released to separate said pressing part from said engaging part; and
  (e) control means for enabling operation of said recording or reproducing means after the pressing force of said pressing means against the engaging part of said recording medium has been released.

2. An apparatus according to claim 1, wherein said pressing means has one end which is fixed to a position of said cassette holding means which is not confronting to said rotary driving means, so that it is swingably supported, and another end, which is a free end, on which said pressing part is formed and disposed at a position which is confronting to said rotary driving means.

3. An apparatus according to claim 2, wherein said cassette holding means consists of an outer cover and a holder.

4. An apparatus according to claim 1, wherein said rotary driving means includes a mounting part for mounting said recording medium.

5. An apparatus according to claim 4, wherein said mounting part includes a region consisting of a magnet for attracting said recording medium.

6. An apparatus according to claim 1, wherein the engaging part of said recording medium is positioned at a center of said recording medium.

7. An apparatus for recording and/or reproducing information on and/or from a disc-shaped recording medium housed in a cassette, comprising:
  (a) recording or reproducing means for recording and/or reproducing the information on and/or from said recording medium;
  (b) rotary driving means for engaging an engaging part formed on said recording medium and for rotating said recording medium;
  (c) cassette holding means movable from a first position where said cassette holding means can receive said cassette to a second position where said cassette can engage with said rotary driving means;
  (d) pressing means having a pressing part for pressing the engaging part of said recording medium, wherein as said recording medium is moved by said cassette holding means from said first position to said second position, said pressing part is caused to come into contact with said engaging part and said pressing part is pressed against said engaging part under the action of a pressing force of said pressing means to press said engaging part onto said rotary driving means to mount it thereon, and said pressing force of said pressing means is released to hold said pressing part separated from said engaging part;
  (e) control means for enabling operation of said recording or reproducing means after the pressing force of said pressing means against the engaging part of said recording medium has been released; and
  (f) arresting means for arresting said cassette holding means for holding said pressing part at a position separated from said engaging part.

8. An apparatus according to claim 7, wherein said pressing means has one end which is fixed to a position of said cassette holding means which is not confronting to said rotary driving means, so that it is swingably supported, and another end, which is a free end, on which said pressing part is formed and disposed at a position which is confronting to said rotary driving means.

9. An apparatus according to claim 7, wherein said cassette holding means consists of an outer cover and a holder.

10. An apparatus according to claim 7, wherein said rotary driving means includes a mounting part for mounting said recording medium.

11. An apparatus according to claim 10, wherein said mounting part includes a region consisting of a magnet for attracting said recording medium.

12. An apparatus according to claim 7, wherein the engaging part of said recording medium is positioned at a center of said recording medium.

* * * * *

UNITED STATES PATENT AND TRADEMARK OFFICE
CERTIFICATE OF CORRECTION

PATENT NO. : 5,381,286
DATED : January 10, 1995
INVENTOR(S) : Nobuo Tezuka

It is certified that error appears in the above-indentified patent and that said Letters Patent is hereby corrected as shown below:

Col. 6, line 49.   Change "n" to -- an --.

Col. 8, line 31.   Change "35and" to -- 35 and --.

Col. 9, line 19.   Change "1t" to -- 11 --.

Col. 10, line 9.   Change "if" to -- 1f --.

Col. 10, line 44.  Change "i" to -- 1 --.

Col. 11, line 36.  Change "sideway" to -- sideways --.

Col. 12, line 32.  Delete "From".

Col. 12, line 44.  Change "latchet" to -- ratchet --.

Col. 15, line 30.  After "has" insert -- been --.

Col. 17, line 27.  Delete "with".

Col. 18, line 68.  Change "1i" to -- 11 --.

Signed and Sealed this

Twenty-second Day of August, 1995

BRUCE LEHMAN

*Attest:*

*Attesting Officer*     *Commissioner of Patents and Trademarks*